United States Patent
Nakata et al.

(10) Patent No.: US 12,332,969 B2
(45) Date of Patent: Jun. 17, 2025

(54) INFORMATION PROCESSING METHOD, INFORMATION PROCESSING DEVICE, AND COMPUTER SYSTEM

(71) Applicant: Kioxia Corporation, Tokyo (JP)

(72) Inventors: Kengo Nakata, Kawasaki (JP); Asuka Maki, Kawasaki (JP); Daisuke Miyashita, Kawasaki (JP); Jun Deguchi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 396 days.

(21) Appl. No.: 17/807,005

(22) Filed: Jun. 15, 2022

(65) Prior Publication Data

US 2023/0153386 A1 May 18, 2023

(30) Foreign Application Priority Data

Nov. 18, 2021 (JP) .................................. 2021-188040

(51) Int. Cl.
*G06F 18/214* (2023.01)

(52) U.S. Cl.
CPC ........ *G06F 18/214* (2023.01); *G06F 2218/02* (2023.01); *G06F 2218/08* (2023.01)

(58) Field of Classification Search
CPC .............. G06F 18/214; G06F 2218/02; G06F 2218/08; G06F 16/532; G06F 16/2462;
(Continued)

(56) References Cited

U.S. PATENT DOCUMENTS 11,080,918 B2 * 8/2021 Chen ........................ G06N 3/08
11,086,924 B2 8/2021 Watanabe et al.
(Continued)

FOREIGN PATENT DOCUMENTS

CN 111814028 B 2/2021
JP 4629280 B2 2/2011
(Continued)

OTHER PUBLICATIONS

Chen, Y. et al. "Meta-Baseline: Exploring Simple Meta-Learning for Few-Shot Learning" https.//arxiv.org/abs/2003.04390, 2021. (12 pages).
(Continued)

*Primary Examiner* — Dangelino N Gortayo
(74) *Attorney, Agent, or Firm* — Oblon, McClelland, Maier & Neustadt, L.L.P.

(57) ABSTRACT

According to one embodiment, an information processing method includes: calculating a first feature amount of query data in a first field; calculating first similarity degrees between the first feature amount and second feature amounts in the first field; obtaining, based on the first similarity degrees, third feature amounts in a second field that are associated with feature amounts selected from the second feature amounts, the second field being different from the first field; calculating fourth feature amounts in the second field, for choices concerning the query data; calculating second similarity degrees between the third feature amounts and the fourth feature amounts; and selecting, based on the second similarity degrees, an answer to the query data among answer candidates corresponding to the third feature amounts.

17 Claims, 18 Drawing Sheets

(58) Field of Classification Search
CPC .. G06F 16/2455; G06F 16/583; G06V 10/761
See application file for complete search history.

(56) References Cited

U.S. PATENT DOCUMENTS

| | | | | |
|---|---|---|---|---|
| 2015/0066957 | A1* | 3/2015 | Cevahir | G06F 16/583 |
| | | | | 707/749 |
| 2021/0019342 | A1* | 1/2021 | Peng | G06F 16/5854 |
| 2021/0165818 | A1* | 6/2021 | Matsushita | G06F 16/55 |
| 2022/0067081 | A1* | 3/2022 | Saito | G06F 16/55 |

FOREIGN PATENT DOCUMENTS

| | | | |
|---|---|---|---|
| JP | 4703487 | B2 | 6/2011 |
| JP | 5121917 | B2 | 1/2013 |
| JP | 6811645 | B2 | 1/2021 |

OTHER PUBLICATIONS

Radford, A. et al. "Learning Transferable Visual Models From Natural Language Supervision" https://arxiv.org/abs/2103.00020, 2021 (48 pages).

Nidhi Goel, et al., "A Refined Hybrid Image Retrieval System using Text and Color," IJCSI International Journal of Computer Science Issues, vol. 9, Issue 4, No. 1, Jul. 2012, pp. 48-56.

Himanshu Sharma, et al., "A survey of methods, datasets and evaluation metrics for visual question answering," Image and Vision Computing, vol. 116, 104327, 2021, 34 pages.

* cited by examiner

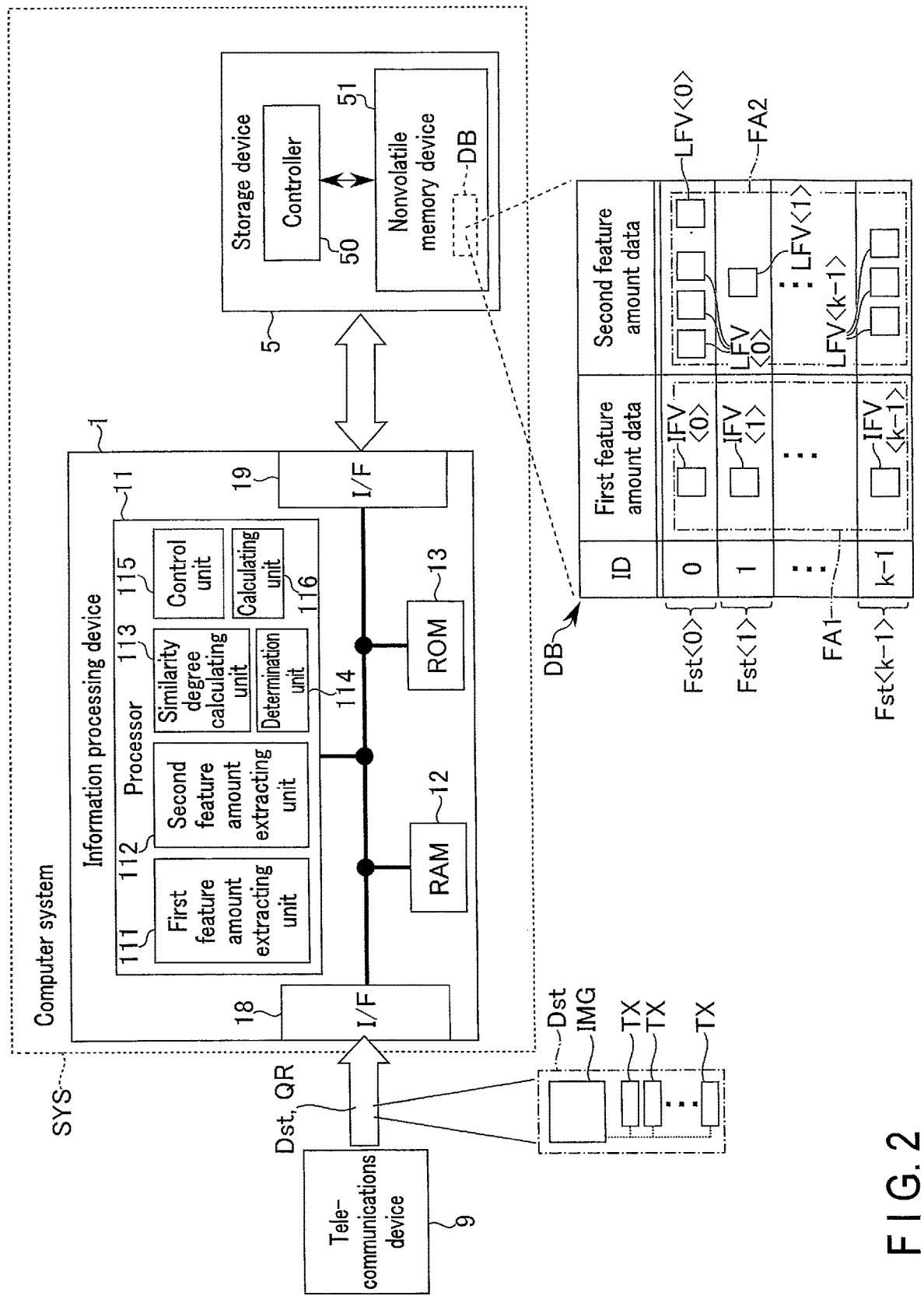
F I G. 2

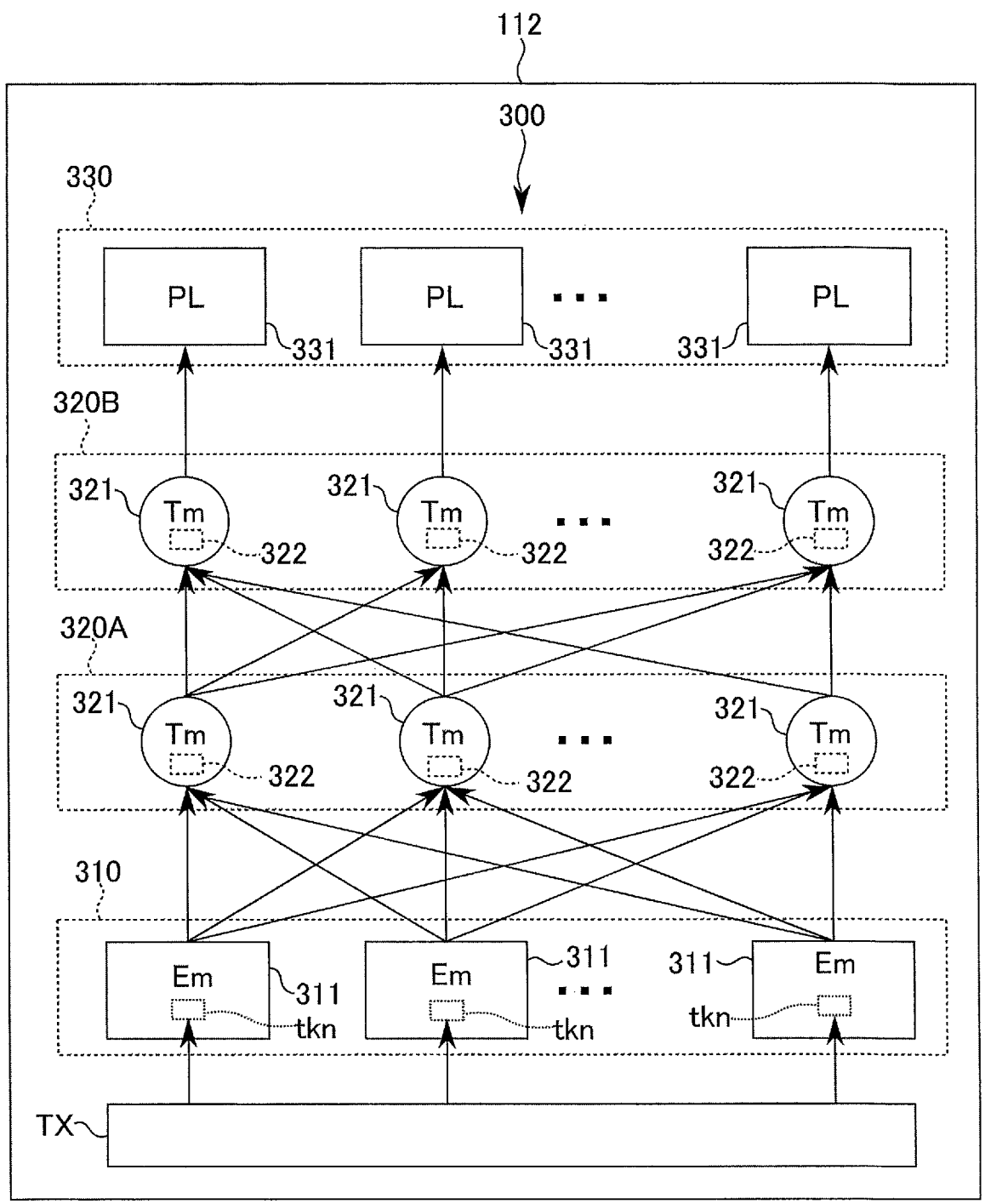
F I G. 4

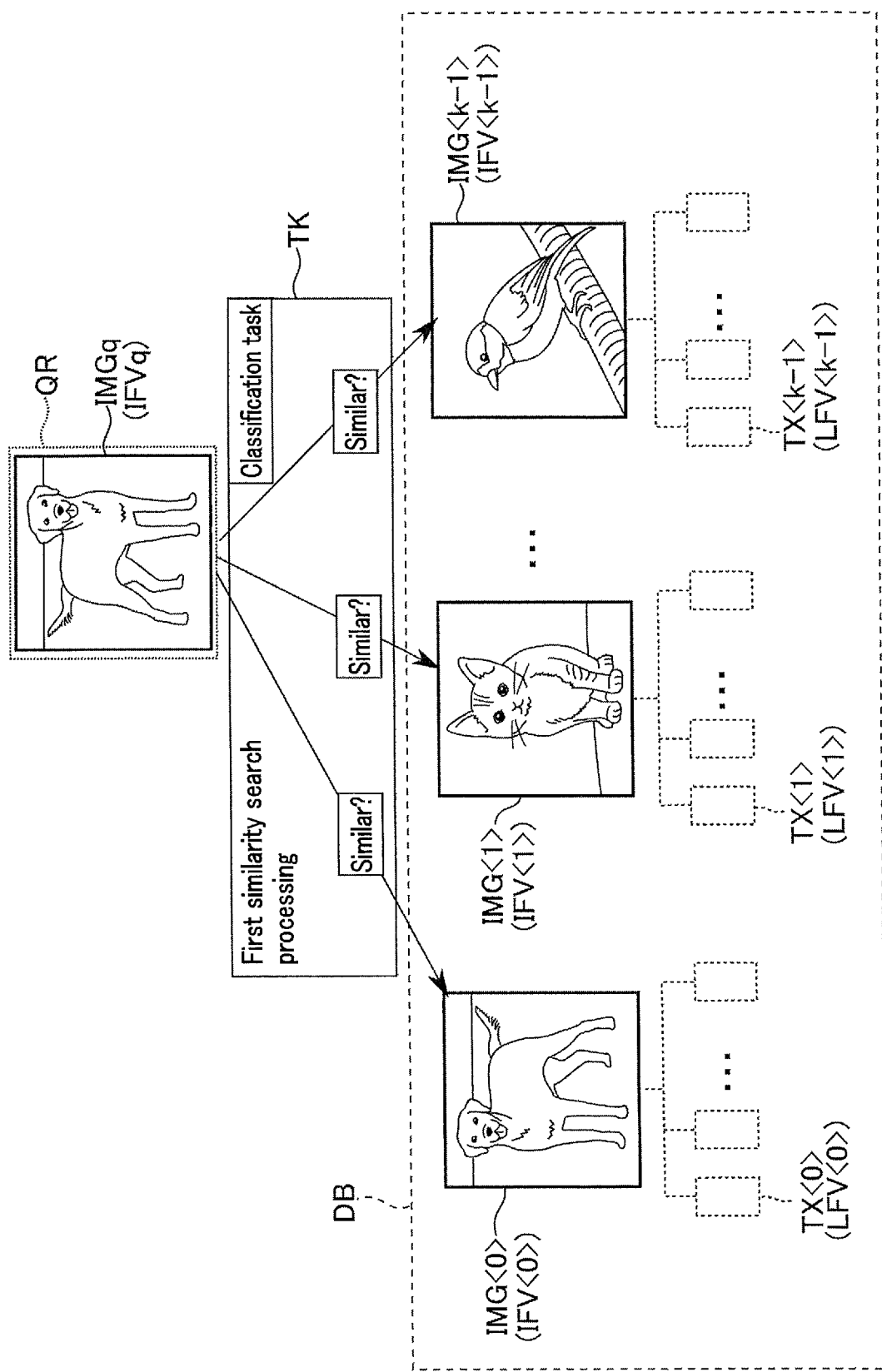
F I G. 5

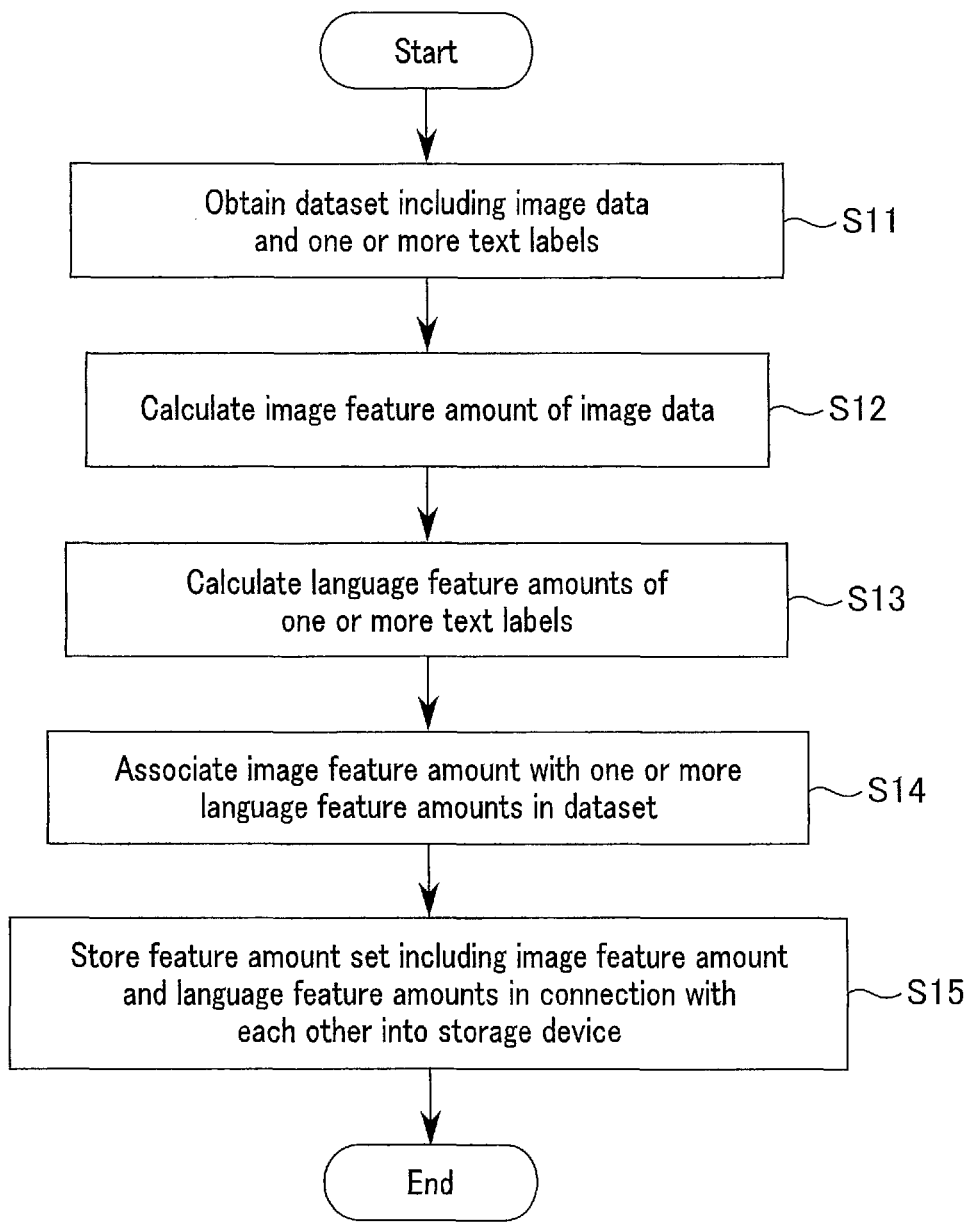
F I G. 9

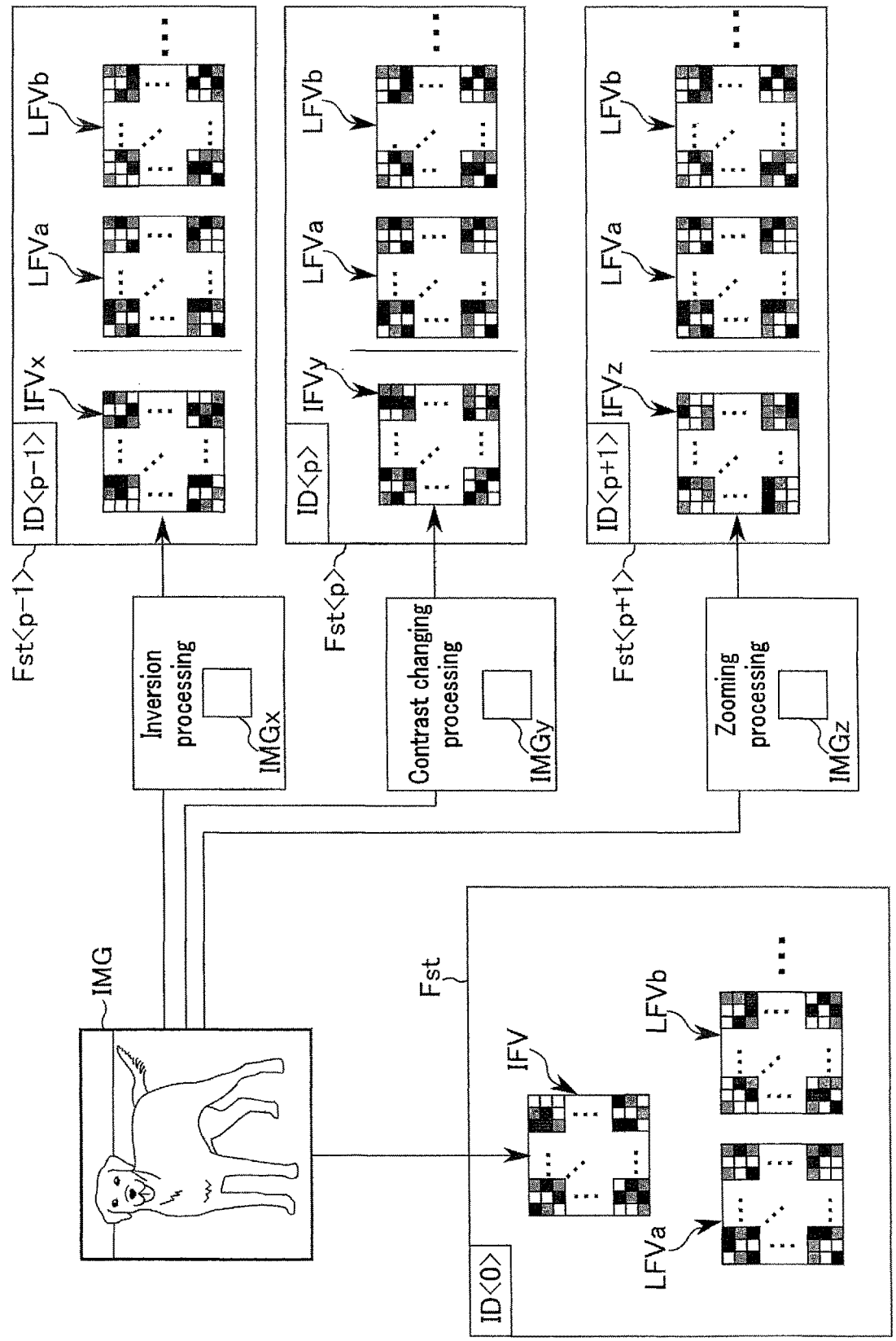
F I G. 11

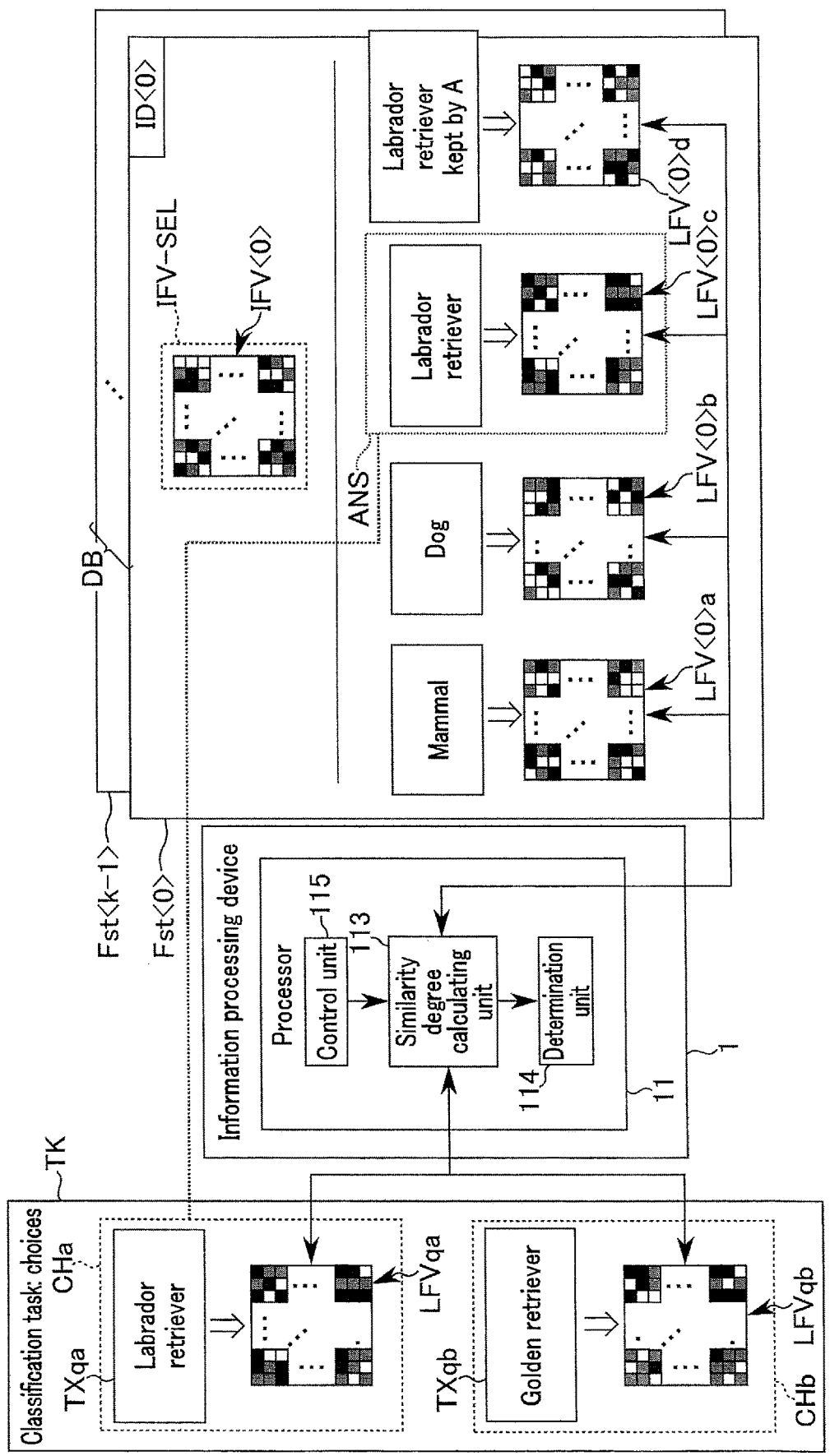
F I G. 16

INFORMATION PROCESSING METHOD, INFORMATION PROCESSING DEVICE, AND COMPUTER SYSTEM

CROSS-REFERENCE TO RELATED APPLICATIONS

This application is based upon and claims the benefit of priority from Japanese Patent Application No. 2021-188040, filed Nov. 18, 2021, the entire contents of which are incorporated herein by reference.

FIELD

Embodiments described herein relate generally to an information processing method, an information processing device, and a computer system.

BACKGROUND

Methods, devices, and systems concerning machine learning have been studied and proposed. For example, various calculation techniques, processing techniques, system configurations, and device configurations have been studied and proposed for improving precisions of various types of machine learning tasks. With a result of machine learning, query data being input data can be classified into a given category/class. In order to improve an accuracy of the classification, there is a demand for an improved precision of a machine learning task.

BRIEF DESCRIPTION OF THE DRAWINGS

FIG. 2 is a block diagram illustrating a configuration example of an information processing device in the first embodiment.

FIG. 4 is a block diagram illustrating another part of the configuration example of the information processing device in the first embodiment.

FIG. 5 is a schematic diagram for explaining a part of concept of an information processing method in the first embodiment.

FIG. 9 is a flowchart for explaining an advance preparation phase of a computer system in an embodiment.

FIG. 11 is a schematic diagram for explaining another part of the advance preparation phase in the first embodiment.

FIG. 16 is a schematic diagram for explaining still another part of the classification task phase in the first embodiment.

DETAILED DESCRIPTION

Figure 1:
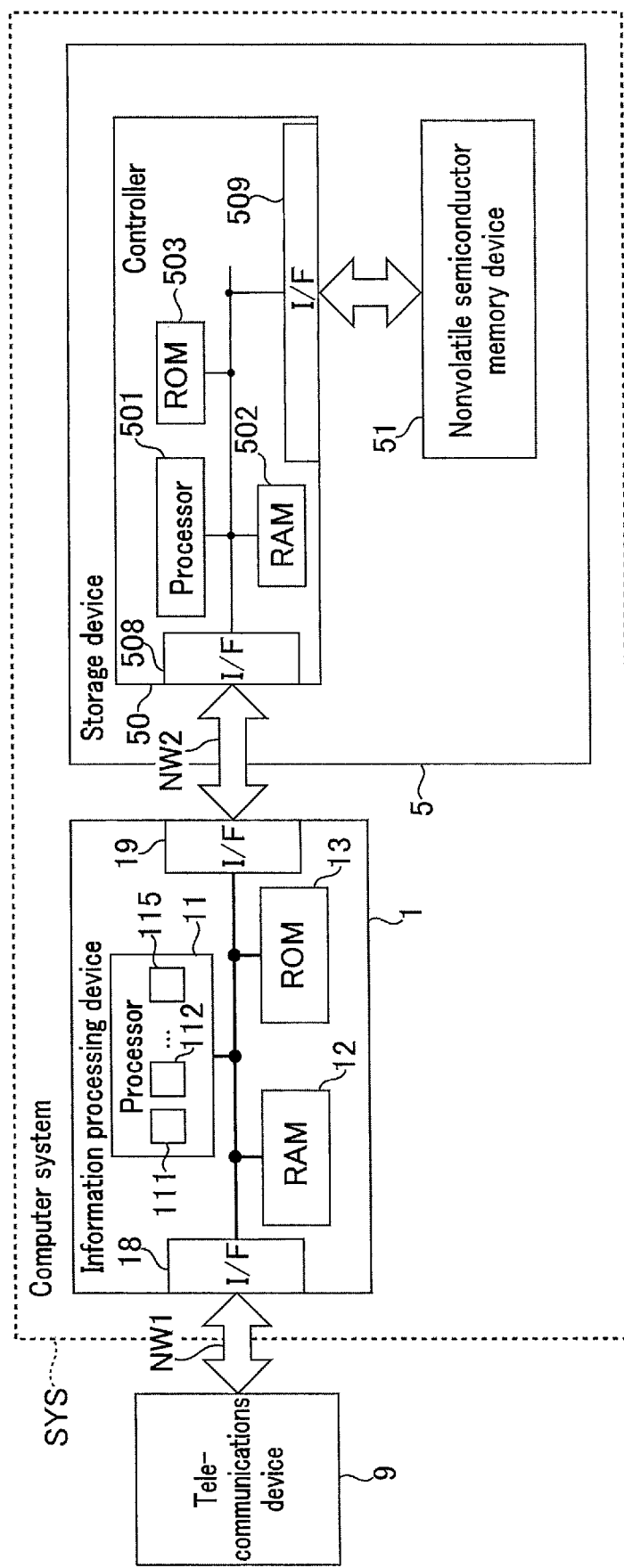
FIG. 1 is a block diagram illustrating a configuration example of a computer system in a first embodiment.

The present embodiment will be described in detail below with reference to the drawings. In the following description, components having the same function and structure will be denoted by the same reference character.

Further, in the following embodiments, when constituent components (e.g., circuits, wires, various voltages and signals) with reference characters to which numeric characters/alphabetic characters for distinction are appended need not be distinguished from one another, indications (reference characters) without the appended numeric characters/alphabetic characters are used.

In general, according to one embodiment, an information processing method includes: receiving query data to be processed; calculating a first feature amount of the query data in a first field; calculating a plurality of first similarity degrees between the first feature amount and a plurality of second feature amounts in a first feature amount space in the first field; obtaining, based on the plurality of first similarity degrees, a plurality of third feature amounts in a second field that are associated with one or more feature amounts selected from the plurality of second feature amounts, from a second feature amount space in the second field, the second field being different from the first field; calculating one or more fourth feature amounts in the second field, for a plurality of choices concerning the query data; calculating a plurality of second similarity degrees between the plurality of third feature amounts and the one or more fourth feature amounts; and selecting, based on the plurality of second similarity degrees, at least one answer to the query data from among a plurality of answer candidates corresponding to the plurality of third feature amounts.

[A] FIRST EMBODIMENT

With reference to FIG. 1 to FIG. 17, a computer system of the embodiment, an information processing device of the embodiment, and an information processing method of the embodiment will be described. Note that the information processing method of the embodiment can include a method for controlling the computer system of the embodiment and a method for controlling the information processing device of the embodiment.

(1) CONFIGURATION

FIG. 1 is a schematic diagram for explaining a configuration example of a computer system SYS in the present embodiment.

The computer system SYS in the present embodiment communicates with a telecommunications device 9 over a network NW1 that is wireless or wired.

The network NW1 is, for example, the Internet or an intranet.

The telecommunications device 9 is capable of performing various types of information processing and data processing. The telecommunications device 9 is a device such as a computer device and a mobile device. An example of the computer device is a personal computer or a server computer. An example of the mobile device is a smartphone, a feature phone, or a tablet device. Note that the telecommunications device 9 may be a terminal device or may be a host device connected to a terminal device over a network (not illustrated).

The computer system SYS is capable of receiving various types of information and various types of data from the telecommunications device 9 over the network NW1. The computer system SYS is capable of transmitting various types of information and various types of data to the telecommunications device 9 over the network NW1.

The computer system SYS is capable of performing various types of information processing. The computer system SYS includes, for example, a knowledge exploring artificial intelligence (AI).

The computer system SYS includes an information processing device 1 in the present embodiment and a storage device 5. Note that the information processing device 1 and the storage device 5 may be provided within one housing (not illustrated) or may be provided in housings different from each other as long as the information processing device 1 and the storage device 5 can communicate with each other directly or indirectly. As long as the information processing device 1 and the storage device 5 can communicate with each other directly or indirectly, the information processing device 1 and the storage device 5 may be located in the same country or region or may be located in countries or regions different from each other.

The information processing device 1 is capable of performing various types of processing and tasks based on machine learning. For example, the information processing device 1 is configured to be capable of performing deep learning with supervised or unsupervised learning data. The information processing device 1 includes a computer device. The information processing device 1 is, for example, a personal computer. Note that the information processing device 1 may be a mobile device such as a smartphone or a tablet device.

The information processing device 1 includes a processor 11, a random-access memory (RAM) 12, a read-only memory (ROM) 13, and a plurality of interface circuits 18 and 19.

The processor 11 performs control processing and calculation processing for performing the various types of processing and tasks of the information processing device 1. For example, the processor 11 includes a plurality of processing units 111, 112, and 115 for the various types of control processing and calculation processing.

The RAM 12 temporarily stores various types of data and software to be used by the information processing device 1. The RAM 12 functions as a working memory and a buffer memory in the information processing device 1. The RAM 12 can be accessed by the processor 11 for obtaining data.

For example, the data includes user data to be processed, configuration information to be used for various types of systems and devices, parameters to be used for the various types of processing, and a part of the software. For example, the software can include an execution program, firmware, an application, and an operating system (OS). The data and/or the software can correspond to information to be used by the various types of systems and devices.

The ROM 13 stores, in a substantially nonvolatile manner, an operating system (OS), firmware, various types of software, and various types of data, which are to be used by the information processing device 1. The ROM 13 can be accessed by the processor 11 for obtaining data.

The interface circuit 18 performs transfer of various types of data and various types of control signals between the information processing device 1 and the telecommunications device 9 based on a given interface standard.

The interface circuit 19 performs transfer of various types of data and various types of control signals between the information processing device 1 and the storage device 5 based on a given interface standard.

An internal configuration and functions of the information processing device 1 will be described later in detail.

Note that the information processing device 1 may further include a display device (not illustrated) such as a liquid crystal display, a sound device (not illustrated) such as a speaker and a microphone, a user input device (not illustrated) such as a keyboard and a touch panel, and/or an imaging device (not illustrated) such as a camera.

The storage device 5 is capable of storing various types of information and various types of data. The storage device 5 is capable of communicating the information processing device 1 over a network NW2 that is wireless or wired. The storage device 5 is, for example, an SSD. In a case where the storage device 5 is an SSD, the storage device 5 includes a controller 50 and a nonvolatile semiconductor memory device 51. In the case where the storage device 5 is an SSD, the nonvolatile semiconductor memory device 51 is a NAND flash memory.

The controller 50 instructs the nonvolatile semiconductor memory device 51 to perform various types of operation sequences such as a write sequence and a read sequence of the nonvolatile semiconductor memory device 51. The controller 50 manages a memory space (an address space) that is set in the nonvolatile semiconductor memory device 51. The controller 50 controls transfer of data between the information processing device 1 and the storage device 5.

The controller 50 includes a processor 501, a RAM 502, a ROM 503, and a plurality of interface circuits 508 and 509.

The processor 501 is capable of performing various types of processing such as internal processing of the storage device 5, internal processing of the controller 50, and control processing of the nonvolatile semiconductor memory device 51. For example, the processor 501 performs the various types of processing based on instructions or requests from the information processing device 1.

The RAM 502 is a memory device that temporarily stores various types of data to be used by the controller 50. The RAM 502 functions as a working memory and a buffer memory in the controller 50. The RAM 502 temporarily stores information and data from the nonvolatile semiconductor memory device 51. The RAM 502 temporarily stores information and data from the information processing device 1. The RAM 502 can be accessed by the processor 501 for obtaining data.

The ROM 503 stores, in a substantially nonvolatile manner, firmware, various types of software, and various types of data, which are to be used by the storage device 5. The ROM 503 can be accessed by the processor 501 for obtaining data.

The interface circuit 508 receives various types of information, various types of data, and various types of control signals from the information processing device 1 based on a given interface standard. The interface circuit 508 transmits a control signal from the information processing device 1 to the processor 501. The interface circuit 508 transmits information and data from the information processing device 1 to the RAM 502. The interface circuit 508 transmits a control signal from the processor 501 and information and data in the RAM 502 to the information processing device 1 under control from the processor 501.

The interface circuit 509 communicates with the nonvolatile semiconductor memory device 51 based on a given interface standard.

The interface circuit 509 transmits data in the RAM 502 to the nonvolatile semiconductor memory device 51 under control from the processor 501. The interface circuit 509 transmits a command and an address to the nonvolatile semiconductor memory device 51 depending on a requested operation sequence. From nonvolatile semiconductor memory device 51, the interface circuit 509 receives data stored in the nonvolatile semiconductor memory device 51.

The interface circuit 509 transmits various types of control signals to the nonvolatile semiconductor memory device 51 under control from the processor 501. The interface circuit 509 receives a signal that is controlled by the nonvolatile semiconductor memory device 51. The interface circuit 509 transfers data, commands, and addresses between the controller 50 and the nonvolatile semiconductor memory device 51.

For example, in a case where the nonvolatile semiconductor memory device 51 is a NAND flash memory, the interface standard of the interface circuit 509 conforms to Toggle DDR interface standard or the Open NAND Flash interface (ONFi) standard.

In addition to the constituent components described above, the controller 50 may further include another constituent component such as an error checking and correction (ECC) circuit. The ECC circuit is a circuit for encoding and decoding data transferred between the controller 50 and the nonvolatile semiconductor memory device 51.

Note that the nonvolatile semiconductor memory device 51 may be a memory device other than a NAND flash memory as long as the nonvolatile semiconductor memory device 51 is capable of storing data in a substantially nonvolatile manner.

The storage device 5 may be a hard disc drive (HDD). In this case, the storage device 5 includes magnetic disks in place of the nonvolatile semiconductor memory device 51.

Figure 3:
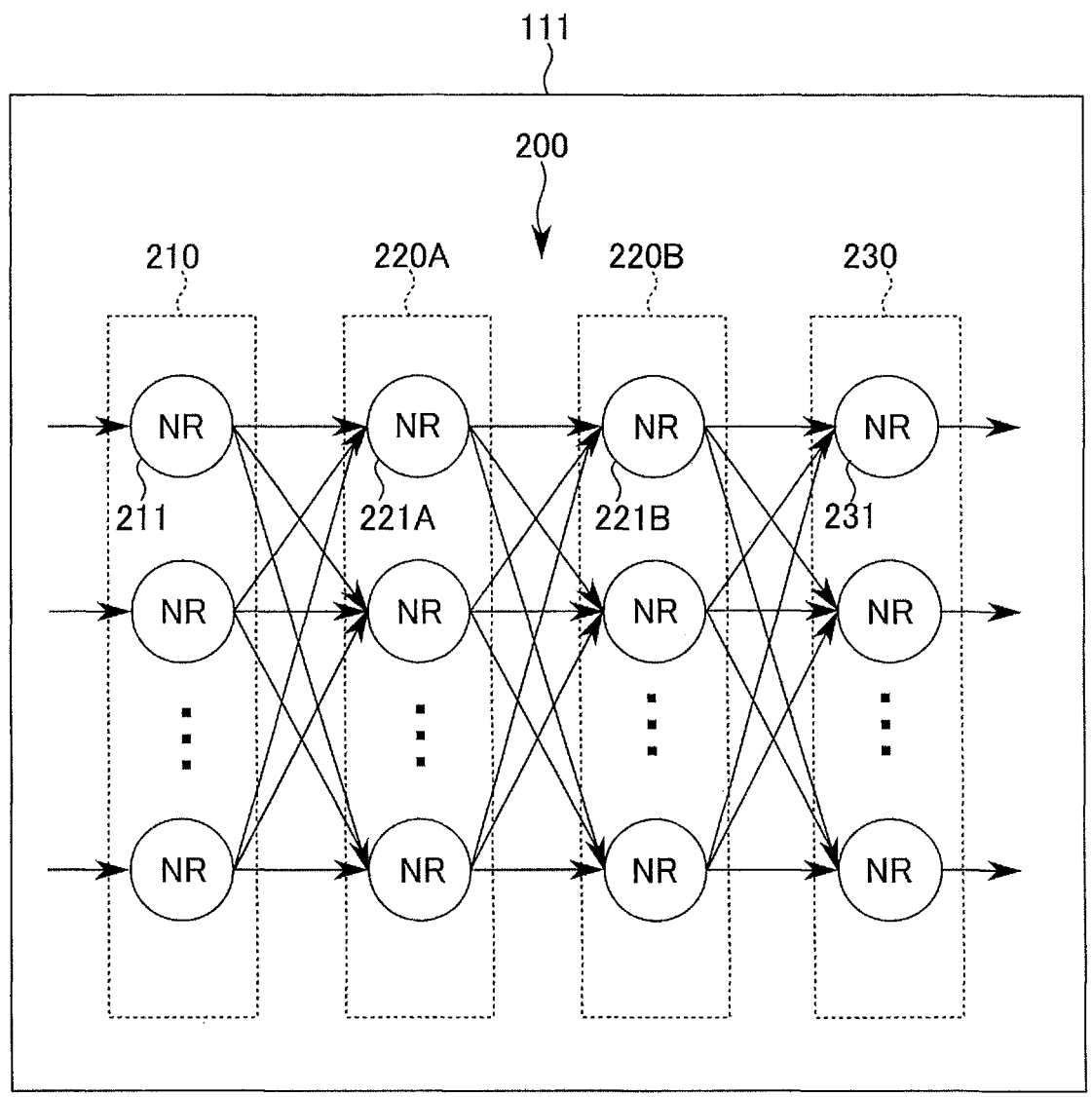
FIG. 3 is a block diagram illustrating a part of the configuration example of the information processing device in the first embodiment.

FIG. 2 to FIG. 4 are each a schematic block diagram for explaining the information processing device 1 in the present embodiment.

For example, the information processing device 1 in the present embodiment performs a classification task based on machine learning. In the classification task, the information processing device 1 in the present embodiment classifies query data, which is question data, into a given category/class.

As illustrated in FIG. 2, in the information processing device 1 in the present embodiment, the processor 11 includes a first feature amount extracting unit 111, a second feature amount extracting unit 112, a similarity degree calculating unit 113, a determination unit 114, a control unit 115, and a calculating unit 116.

The first feature amount extracting unit 111 calculates a feature amount concerning a first field of data to be processed based on a given calculation model/processing model concerning the first field. The feature amount is a vector including a plurality of numeric values. The first field is selected from among an image field, a natural language field, a sound field, a biological signal field, an electric signal field, and the like.

Note that the field can be alternatively called kind, type, mode or group.

The second feature amount extracting unit 112 calculates a feature amount concerning a second field of data to be processed based on a given calculation model/processing model concerning the second field. The second field is different from the first field. The second field is selected from among an image field, a natural language field, a sound field, a biological signal field, an electric signal field, and the like, except for the field selected as the first field.

The similarity degree calculating unit 113 calculates a similarity degree between a given data item and another data item. For example, the similarity degree calculating unit 113 calculates a similarity degree between a feature amount of the given data item concerning the first field and a feature amount of the other data item concerning the first field. For example, the similarity degree calculating unit 113 calculates a similarity degree between a feature amount of the given data item concerning the second field and a feature amount of the other data item concerning the second field.

For example, the similarity degree is calculated based on an inner product of the two feature amounts, a cosine similarity degree of the two feature amounts, a distance between the two feature amounts, or the like. The distance used for calculating the similarity degree is obtained in a form of any one of, for example, a Euclidean distance, a Manhattan distance, and a Minkowski distance.

The determination unit 114 performs a determination on various types of processing performed by the processor 11. For example, the determination unit 114 determines whether a given data item and another data item (e.g., two feature amounts) are similar to each other, based on a result of the calculation by the similarity degree calculating unit 113. When the similarity degree calculated for a given data item and another data item is greater than or equal to a given threshold value, the determination unit 114 determines that the given data item and the other data item are similar to each other. When the similarity degree calculated for a given data item and another data item is less than the given threshold value, the determination unit 114 determines that the given data item and the other data item are not similar to each other.

In this manner, the similarity degree calculating unit 113 and the determination unit 114 search a database DB described later for a data item that has a high similarity degree to a given data item. The database DB is stored in the storage device 5.

The control unit 115 controls various types of processing performed by the processor 11.

The calculating unit 116 performs various types of calculation processing except for calculation processing of the feature amount and the similarity degree.

In the information processing device 1 in the present embodiment, the processor 11 performs a classification task on query data QR. Specifically, the processor 11 classifies the query data QR based on a feature amount in the first field concerning the query data QR and a feature amount in the second field concerning choices of an answer to the query data QR.

The following description will be given of a case where the first field is the image field, and the second field is the natural language field.

In this case, the first feature amount extracting unit 111 is referred to also as an image feature amount extracting unit 111, and the second feature amount extracting unit 112 is referred to also as a language feature amount extracting unit 112. Further, a feature amount concerning the image field is referred to as an image feature amount, and a feature amount in the natural language field is referred to as a language feature amount.

FIG. 3 is a schematic diagram illustrating an example of a configuration example of the image feature amount extracting unit 111 in the information processing device 1 in the present embodiment.

As illustrated in FIG. 3, the image feature amount extracting unit 111 uses, for example, a convolutional neural network (CNN) 200 to calculate and extract a feature amount of image data. In the present embodiment, the image data is referred to as image data item or image file, or simply as image.

In the image feature amount extracting unit 111, the CNN 200 includes an input layer 210, one or more hidden layers 220 (220A and 220B), and an output layer 230.

The input layer 210 receives the whole or a part of image data that is a calculation object for the image feature amount. The input layer 210 transmits data based on the received image data to the hidden layers 220. The input layer 210 includes a plurality of arithmetic elements 211. In FIG. 3, the arithmetic elements 211 are indicated as "NR".

The arithmetic element 211 is referred to as artificial neuron or simply as neuron. The arithmetic elements 211 each extract a signal having a given size (e.g., bit number) based on the image data including a plurality of signals. The signal supplied to the hidden layer 220 may be data as being extracted by the arithmetic elements 211 or may be data subjected to any type of processing by the arithmetic elements 211.

The hidden layer 220 performs various types of calculation processing on the data from the input layer 210. The hidden layer 220 includes a plurality of arithmetic elements (artificial neurons) 221 (221A and 221B).

The plurality of arithmetic elements 221 are connected together in a network pattern. Each arithmetic element 221 includes a plurality of input nodes and a plurality of output nodes. The plurality of input nodes of each arithmetic element 221 are connected to output nodes of a plurality of arithmetic elements 221 in a previous layer. The plurality of output nodes of each arithmetic element 221 are connected to input nodes of a plurality of arithmetic elements 221 in a subsequent layer. Each arithmetic element 221 performs convolution processing using parameters on the supplied data. For example, the parameters used by each arithmetic element 221 are weight coefficients. For example, the convolution processing is product-sum operation processing. For example, the different arithmetic elements 221 use different sets of weight coefficients to perform the product-sum operation processing on the supplied data.

For example, the hidden layer 220 is layered (multilayered) between the input layer 210 and the output layer 230. In the example illustrated in FIG. 3, the hidden layer 220 includes the two layers 220A and 220B. Arithmetic elements 221A of the hidden layer 220A each perform calculation processing on data from the input layer 210. The arithmetic elements 221A transmit their results of the calculation to arithmetic elements 221B of the hidden layer 220B. The arithmetic elements 221B each perform given calculation processing on the supplied data. The arithmetic elements 221B transmit their results of the calculation to the output layer 230.

When the hidden layer 220 has a layered structure, capabilities of the CNN 200 to perform inference, learning, and classification can be improved. Note that the number of layers of the hidden layer 220 may be three or more or may be one.

The output layer 230 receives data from the arithmetic elements 221 of the hidden layer 220. The output layer 230 performs various types of processing on the received data. The output layer 230 outputs a result of the calculation processing to a layer or a circuit in a subsequent stage. The output layer 230 includes a plurality of arithmetic elements (artificial neurons) 231.

The arithmetic elements 231 are connected to the plurality of arithmetic elements 221. The arithmetic elements 231 perform given processing on results of calculation from the plurality of arithmetic elements 221. The arithmetic elements 231 can hold and output obtained results of the processing.

The CNN 200 calculates the image feature amount of the image data. The CNN 200 thereby extracts the image feature amount of the image data.

Note that the configuration of the image feature amount extracting unit 111 is not limited to a configuration with the CNN 200. As the configuration of the image feature amount extracting unit 111, a configuration not including the CNN 200 may be used depending on a field that is selected in calculation and extraction of the feature amount.

FIG. 4 is a schematic diagram illustrating an example of a configuration example of the language feature amount extracting unit 112 in the information processing device 1 in the present embodiment.

As illustrated in FIG. 4, the language feature amount extracting unit 112 calculates and extracts a feature amount of a text label in a form of a natural language with a neural network to which a natural language processing model such as Bidirectional encoder representations from transformers (BERT) is applied. The text label is data including one or more characters. In the present embodiment, the text label is referred to as text data item, text data, or text file, or simply as label. One or more characters included in a text label are hereafter referred to as a character string.

The example illustrated in FIG. 4 shows a model structure of a BERT 300. As illustrated in FIG. 4, the language feature amount extracting unit 112 with the BERT 300 includes an input layer 310, a transformer layer 320 (320A and 320B), and an output layer 330.

The input layer 310 tokenizes a text or a character string included in a text label TX supplied to the language feature amount extracting unit 112. This converts the text or the character string in the text label TX into a token array including a plurality of tokens tkn. The input layer 310 transmits the token array that has been subjected to various types of processing to the transformer layer 320.

The input layer 310 includes a plurality of embedding units 311. For example, the embedding units 311 each perform token embedding, segment embedding, and/or position embedding. The embedding units 311 each store a token tkn, provide information for distinguishing among texts, and provide information concerning positions of characters. In FIG. 4, the embedding units 311 are each indicated as "Em".

Note that the input layer 310 is referred to as tokenizer layer (or simply as tokenizer) or referred to as embedder layer (or simply as embedder).

The transformer layer 320 receives the token array from the input layer 310. The transformer layer 320 converts the plurality of tokens included in the received token array into a vector. The transformer layer 320 includes a plurality of arithmetic elements (hereinafter referred to also as transformer elements) 321. In FIG. 4, the transformer elements 321 are each indicated as "Tm".

The plurality of transformer elements 321 are connected together in a network pattern. The transformer elements 321 each receive data from a plurality of transformer elements 321 in a previous layer. The transformer elements 321 each transmit a processed data signal to a plurality of transformer elements 321 in a subsequent layer. The transformer elements 321 each include an encoder 322. The encoder 322 performs vector conversion processing on received tokens or signal. For example, in the BERT 300, the transformer elements 321 each include no decoder in a natural language processing model and each include only an encoder 322. The encoder 322 is referred to also as a transformer encoder.

For example, the transformer layer 320 is layered with the two layer 320A and 320B. Note that the number of layers of the transformer layer 320 may be three or more or may be one.

The output layer 330 receives a signal from the transformer layer 320. For example, the output layer 330 makes an adjustment of the signal from the transformer layer 320.

The BERT 300 is capable of performing pretraining without supervised data. The BERT 300 is capable of performing various types of tasks such as a classification task with a relatively high accuracy even when an amount of data for learning is relatively small.

The BERT 300 calculates a language feature amount of a text label. The BERT 300 thereby extracts the language feature amount of the text label.

Note that the configuration of the language feature amount extracting unit 112 is not limited to a configuration with the BERT 300. As the configuration of the language feature amount extracting unit 112, a configuration not including the BERT 300 may be used depending on a field that is selected in calculation and extraction of a feature amount.

The image feature amount extracting unit 111 and the language feature amount extracting unit 112 are provided to the processor 11 in a form of software or firmware. The image feature amount extracting unit 111 and the language feature amount extracting unit 112 are stored in a storage area (not illustrated) of the processor 11 in a form of computer programs that are formed in a given programming language such as Python.

Note that image feature amount extracting unit 111 and the language feature amount extracting unit 112 may be provided in a form of hardware inside the processor 11 or outside the processor 11.

The software of the image feature amount extracting unit 111 and the software of the language feature amount extracting unit 112 may be stored in the ROM 13 or may be stored in the storage device 5. In this case, these pieces of software are retrieved from the ROM 13 to the storage area of the processor 11 or from the storage device 5 to the storage area of the processor 11 when processing with the image feature amount extracting unit 111 and the language feature amount extracting unit 112, which will be described later, is to be performed.

Note that, when the processing with the image feature amount extracting unit 111 and the language feature amount extracting unit 112 described later is to be performed, the pieces of software of the image feature amount extracting unit Ill and the language feature amount extracting unit 112 may be stored in the RAM 12 and may be executed on the RAM 12 by the processor 11.

In the information processing device 1 in the present embodiment, the processor 11 is capable of calculating a plurality of types of feature amounts concerning different fields with the plurality of feature amount extracting units 111 and 112.

For example, as illustrated in FIG. 2, the information processing device 1 in the present embodiment makes advance preparations for performing a classification task, such as pretraining, using a dataset Dst that is supplied from the telecommunications device 9. The dataset Dst includes one item of image data IMG and one or more text labels TX that are associated with the item of image data IMG. Note that the dataset Dst may be supplied to the information processing device 1 from a device other than the telecommunications device 9.

The image feature amount extracting unit 111 described above calculates and extracts an image feature amount IFV of the image data IMG in the dataset Dst.

The language feature amount extracting unit 112 described above calculates and extracts language feature amounts LFV of the text labels TX in the dataset Dst.

For example, a text label TX that is a calculation target of a feature amount in a dataset Dst is data on a character string indicating a file name of image data IMG, data on a character string in metadata on the image data IMG, and data on a character string that is in a given text file and associated with the image data IMG. The language feature amount extracting unit 112 is capable of calculating and extracting a language feature amount of data on character strings that are generated for a task to be performed such as an answer in a classification task and choices for classification. Further, a text label TX may be data on a character string indicating a folder name of a data folder that includes a plurality of items of image data IMG or data on a character string in metadata on the data folder.

The information processing device 1 performs the calculation processing on the supplied dataset Dst for the image feature amount IFV and the language feature amounts LFV, thereby generating a database DB concerning the dataset Dst.

For example, the storage device 5 stores the generated database DB. For example, the database DB includes an image feature amount IFV of image data IMG and language feature amounts LFV of text labels TX in each dataset Dst.

The database DB is stored in a given area of the nonvolatile semiconductor memory device 51 of the storage device 5 in a substantially nonvolatile manner. The area in which the database DB concerning the feature amounts IFV and LFV is stored is referred to also as a feature amount storage area.

In the present embodiment, a set of a plurality of feature amounts concerning the first field is referred to as a first feature amount space, and a set of a plurality of feature amounts concerning the second field is referred to as a second feature amount space. Hereinafter, a set of one or more image feature amounts IFV is referred to as image feature amount space FA1. Hereinafter, a set of one or more language feature amounts LFV is referred to as language feature amount space FA2.

For example, in the database DB, the same identification number (ID) is linked to an image feature amount IFV and one or more language feature amounts LFV concerning the same image data IMG. This associates one image feature amount IFV and one or more language feature amounts LFV with each other for each item of image data IMG.

Hereinafter, a set Fst of an image feature amount IFV and one or more language feature amounts LFV associated with each other is referred to as a feature amount set Fst.

For example, k feature amount sets Fst (Fst<0>, Fst<1>, ..., Fst<k−1>) are managed by the database DB. Here, k is an integer greater than or equal to one.

A plurality of feature amount sets Fst<0>, Fst<1>, ..., Fst<k−1> respectively have identification numbers ID<0>, ID<1>, ..., ID<k−1> different from one another. For each dataset Dst, the processor 11 of the information processing device 1 links an identification number ID to an image feature amount IFV and language feature amounts LFV that are associated with each other.

For example, a plurality of language feature amounts LFV<0> is associated with one image feature amount IFV<0> as in the feature amount set Fst<0> with the identification number ID<0>. In contrast, in some cases, only one language feature amount LFV<1> is associated with one image feature amount IFV<1> as in the feature amount set Fst<1> with the identification number ID<1>.

Note that a feature amount set Fst, with a given identification number stored in the database DB may include only an image feature amount IFV with no language feature amount LFV. Alternatively, a feature amount set Fst with a given identification number may include only a language feature amount LFV with no image feature amount IFV.

In this manner, a plurality of image feature amounts IFV and a plurality of language feature amounts LFV are managed in the database DB such that an image feature amount IFV and a language feature amount LFV that are in correspondence with each other are associated with each other. An image feature amount IFV and a language feature amount LFV in connection with each other are used in a pair in a classification task.

An item of image data IMG and a text label TX in a dataset Dst that are used for calculating feature amounts IFV and LFV may be stored in the storage device 5 as data associated with the database DB. Note that the item of image data IMG and the text label TX need not be stored in the storage device 5 as long as an image feature amount IFV and language feature amounts LFV in each dataset Dst are stored in the storage device 5 in a form of the database DB.

The information processing device 1 in the present embodiment performs a classification task on query data QR using image feature amounts IFV and language feature amounts LFV in the database DB. The query data QR is data to be processed in the task. In the present embodiment, the query data QR is data to be classified in the classification task.

(2) CONCEPT

With reference to FIG. 5 to FIG. 8, a concept of processing performed for the task by the information processing device 1 in the present embodiment will be described.

In the computer system SYS in the present embodiment, the information processing device 1 in the present embodiment performs processing for the classification task on the query data QR with the configuration illustrated in FIG. 1 to FIG. 4.

As illustrated in FIG. 5, the information processing device 1 in the present embodiment performs similarity search processing on image data being the query data QR.

The information processing device 1 determines whether the image data being the query data QR is similar to any of image data IMG<0>, image data IMG<1>, ..., and image data IMG<k−1>.

For example, the similarity search processing on the query data QR is performed by similarity degree calculation processing on an image feature amount IFVq of the query data QR and a plurality of image feature amounts IFV in the database DB.

Based on a result of the similarity calculation processing, the information processing device 1 sorts an item of image data IMG having a high similarity degree to the query data QR of a classification task TK and items of image data IMG having low similarity degree to the query data QR.

Figure 6:
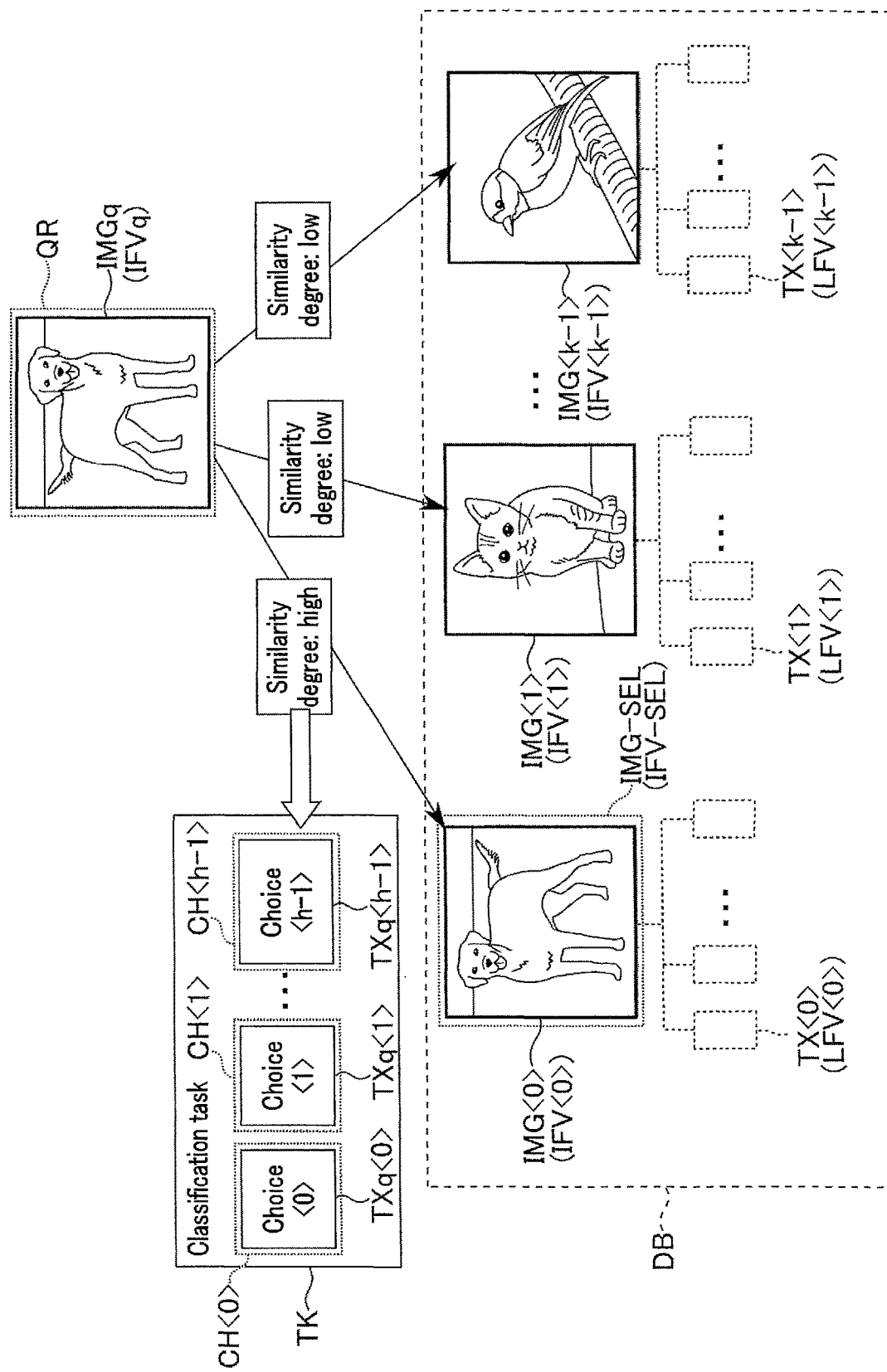
FIG. 6 is a schematic diagram for explaining another part of the concept of the information processing method in the first embodiment.

As illustrated in FIG. 6, the information processing device 1 in the present embodiment generates choices for the classification task TK based on results of the similarity search processing concerning the image data IMG.

Based on results of the similarity search processing on each item of image data IMG concerning the query data QR, the information processing device 1 selects an item of image data IMG having a high similarity degree to the query data QR.

For example, from among a plurality of results of the similarity search processing on the query data QR, the information processing device 1 selects an item of image data IMG (image feature IFV) having the highest similarity degree. In an example illustrated in FIG. 6, image data IMG<0> having an image feature amount IFV<0> is selected as selected image data IMG-SEL.

Based on the selected image data IMG-SEL, the information processing device 1 generates one or more choices CH (CH<0>, CH<1>, ..., CH<h−1>) for the classification task TK.

In the present embodiment, the choices CH are generated and presented in a form of text labels TXq (TXq<0>, TXq<1>, ..., TXq<h−1>). That is, the choices CH are each character string data.

Figure 7:
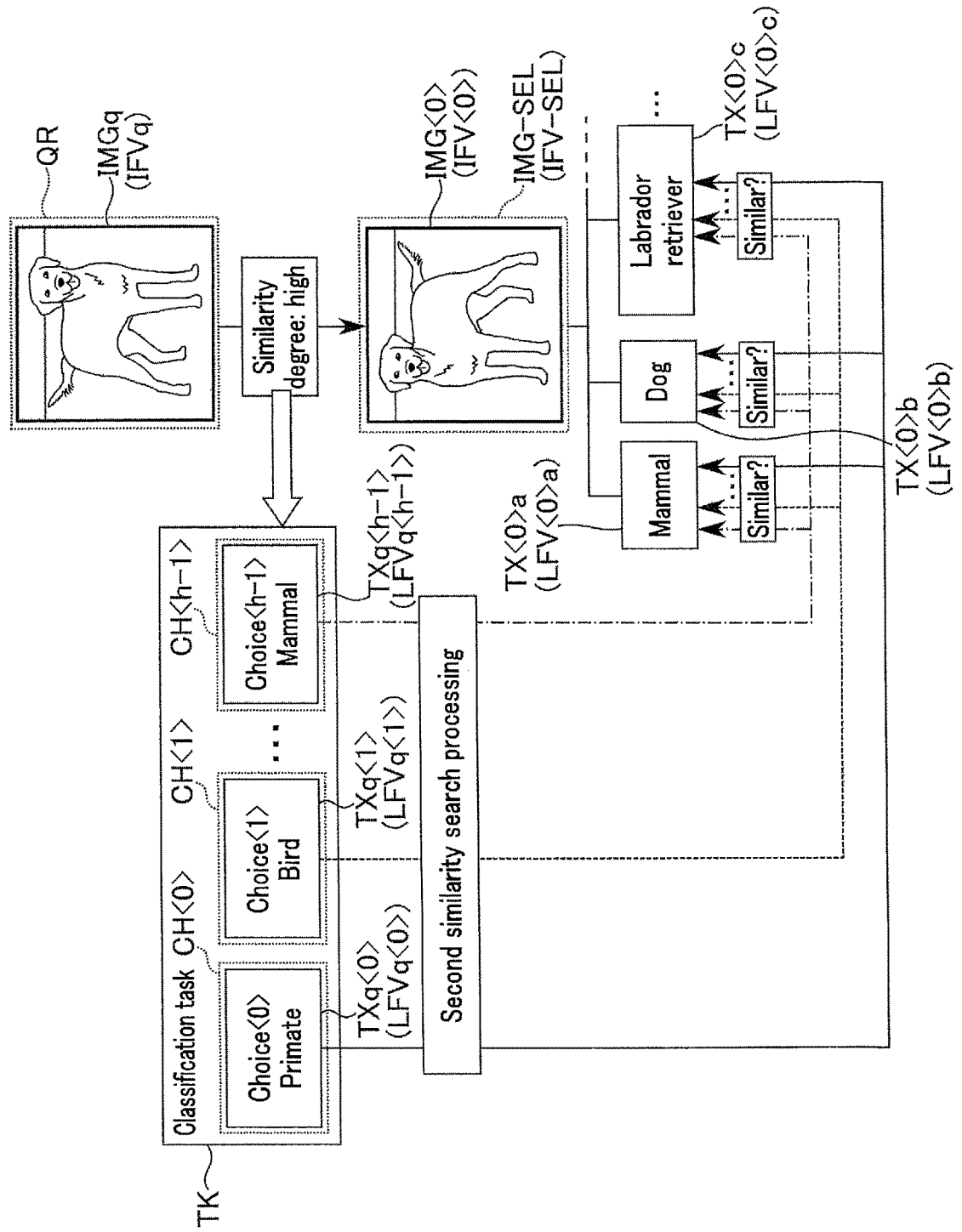
FIG. 7 is a schematic diagram for explaining still another part of the concept of the information processing method in the first embodiment.

As illustrated in FIG. 7, the information processing device 1 in the present embodiment performs the similarity search processing concerning one or more choices CH in the classification task TK on the query data QR.

The information processing device 1 determines, for each of the choices CH, which of one or more text labels TX (TX<0>a, TX<0>b, TX<0>c, ...) associated with the selected image data IMG-SEL (i.e., image data having the high similarity degree to the query data QR) is similar to the choice CH. The one or more text labels TX associated with the selected image data IMG-SEL are treated as answer candidates in the classification task TK.

For example, the determination of similarity degrees between the choices CH of the query data QR and the text labels TX as the answer candidates is performed by the similarity degree calculation processing on the language feature amounts LFVq (LFVq<0>, LFVq<1>, ..., LFVq<h−1>) of the choices CH and the language feature amounts LFV (LFV<0>a, LFV<0>b, FVL<0>c, ...) of the text labels TX.

Based on a result of the similarity degree calculation processing, the information processing device 1 sorts, for each of the choices CH for the classification task TK on the query data QR, a text label TX having a high similarity degree to the choice CH and text labels TX having low similarity degree to the choice CH.

Figure 8:
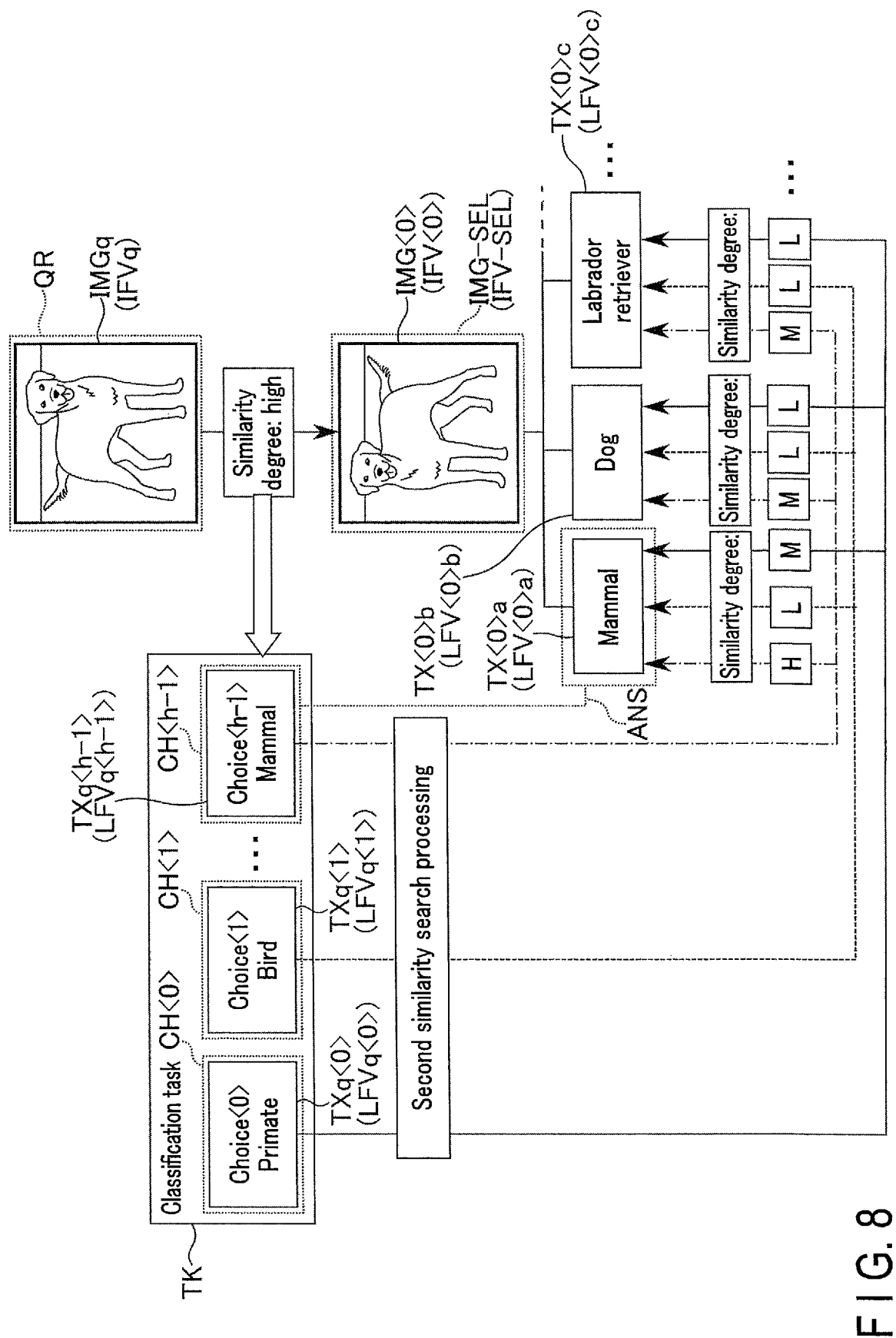
FIG. 8 is a schematic diagram for explaining still another part of the concept of the information processing method in the first embodiment.

As illustrated in FIG. 8, based on results of the similarity search processing using the text labels TX associated with the image data IMG, the information processing device 1 in the present embodiment selects a better answer candidate as an answer ANS in the classification task TK, from among a plurality of answer candidates for a plurality of choices CH.

For example, in an example illustrated in FIG. 8, a choice CH<0> with a number "0" has a character string "PRIMATE", a choice CH<1> with a number "1" has a character string "BIRD", and a choice CH<h−1> with a number "h−1" has a character string "MAMMAL".

For example, in the plurality of text labels TX<0>a, TX<0>b, TX<0>c, . . . associated with the selected image data IMG-SEL (here, image data IMG<0>), the text label TX<0>a has a character string "MAMMAL", the text label TX<0>b has a character string "DOG", and the text label TX<0>c has a character string "LABRADOR RETRIEVER".

As described above, as a result of the calculation of the similarity degrees between the choices CH and the text labels TX, from among the text labels TX of the plurality of choices CH and the plurality of answer candidates for the query data QR, the information processing device 1 selects an answer candidate (and a choice CH corresponding to the answer candidate) having a high similarity degree (e.g., the highest similarity degree) to a given choice CH out of the text labels TX associated with the selected image data IMG-SEL, as the answer ANS in the classification task TK.

In the example illustrated in FIG. 8, the information processing device 1 selects, as the answer ANS, the choice CH<0> having a text label "MAMMAL" and the text label TX<0>a as an answer candidate.

The information processing device 1 thus obtains the answer ANS to the query data QR.

Note that in a case where a plurality of sets of choices CH and text labels TX are determined to have high similarity degrees based on a given determination criterion (threshold value) as the result of the calculation of the similarity degrees between the choices CH and the text labels TX, the plurality of choices CH may be selected as a plurality of answers ANS in the classification task TK.

As described above, in the computer system SYS in the present embodiment, the information processing device 1 in the present embodiment performs the task TK on the query data QR based on the result of the processing of determining similarity degrees concerning the first field (here, the image field) on the query data QR in the first field and the result of the processing of determining similarity degrees concerning the second field different from the first field (here, the natural language field) that are associated with the data in the first field.

The information processing device 1 in the present embodiment thus can improve in reliability in the task.

(3) INFORMATION PROCESSING METHOD

With reference to FIG. 9 to FIG. 17, an information processing method by the information processing device 1 in the computer system SYS in the present embodiment will be described.

Note that the information processing method of the embodiment can include a method for controlling the computer system SYS of the embodiment and a method for controlling the information processing device 1 of the embodiment.

(3-1) Advance Preparation Phase

Figure 10:
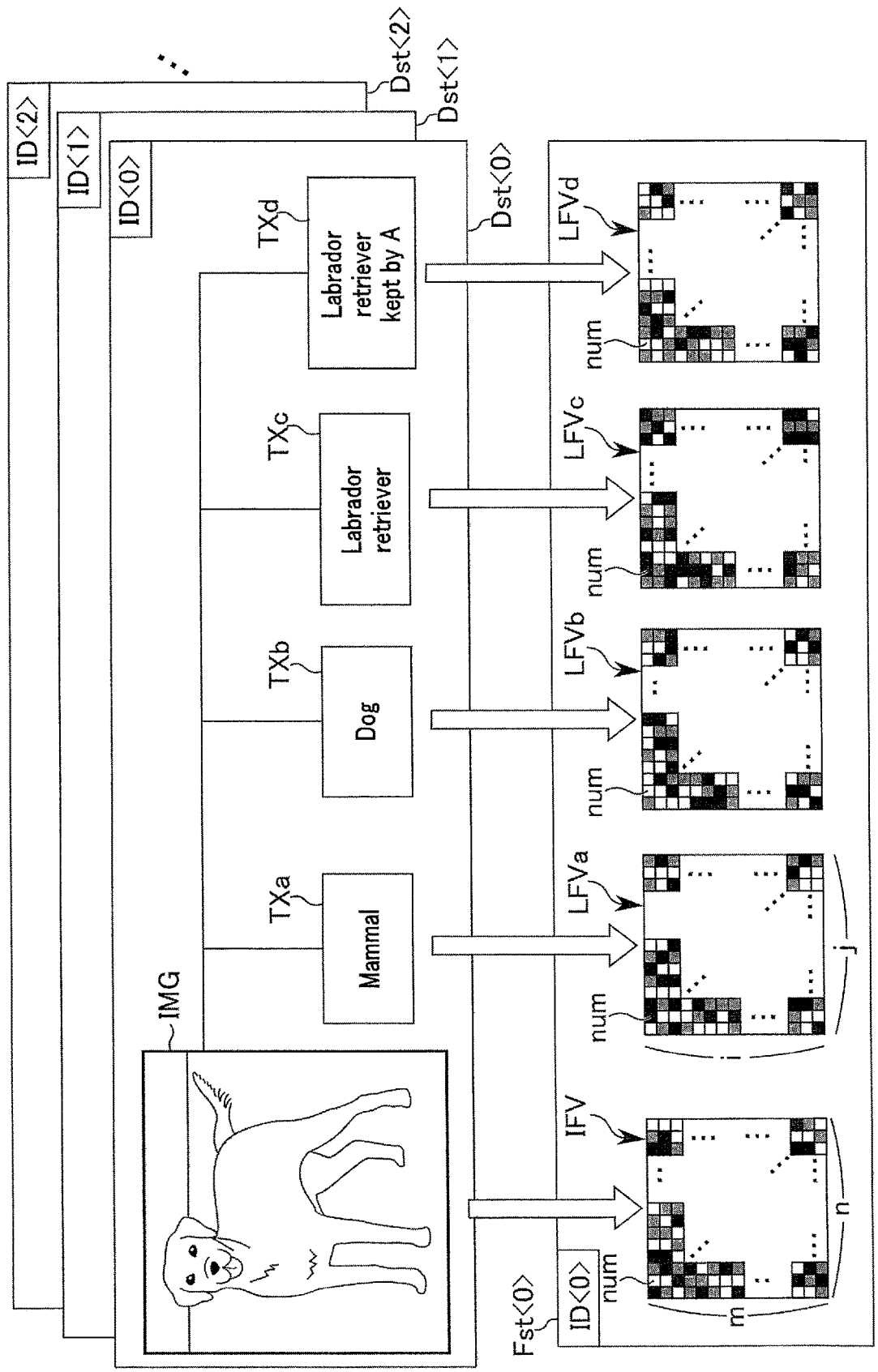
FIG. 10 is a schematic diagram for explaining a part of the advance preparation phase in the first embodiment.

With reference to FIG. 9 and FIG. 10, processing in an advance preparation phase in the information processing method by the information processing device 1 in the present embodiment will be described.

As described below, in the computer system SYS, the processor 11 of the information processing device 1 in the present embodiment generates, in the advance preparation phase in which one or more datasets Dst are used, an image feature amount IFV of image data IMG included in each of the datasets Dst and language feature amounts LFV of a plurality of text labels TX included in the dataset Dst. The generated image feature amounts IFV and the language feature amounts LFV are stored in the storage device 5.

For example, the advance preparation phase in the present embodiment corresponds to machine learning (e.g., deep learning) and the pretraining by the two feature amount extracting units 111 and 112 of the processor 11 of the information processing device 1.

FIG. 9 is a flowchart for explaining the advance preparation phase in the information processing method by the information processing device 1 in the present embodiment.
<S11>

The information processing device 1 receives datasets Dst. For example, the datasets Dst are supplied from the telecommunications device 9 to the interface circuit 18 of the information processing device 1.

In the information processing device 1, the processor 11 receives the datasets Dst via the interface circuit 18.

FIG. 10 is a schematic diagram for explaining various types of data used in the information processing device 1 and the computer system SYS in the present embodiment.

As illustrated in FIG. 10, the datasets Dst (Dst<0>, Dst<1>, Dst<2>, . . . ) each include image data IMG and one or more text labels TX. The text labels TX each include one or more characters in connection with contents of an object in the image data IMG.

A given dataset Dst includes one item of image data IMG and a plurality of text labels TX in connection with the item of image data IMG.

In an example illustrated in FIG. 10, image data IMG in a dataset Dst<0> is an image of a dog. In the dataset Dst<0>, a text label TXa has a character string "MAMMAL", a text label TXb has a character string "DOG", a text label TXc has a character string "LABRADOR RETRIEVER", and a text label TXd has a character string "LABRADOR RETRIEVER KEPT BY A".

Text labels TX in each dataset Dst may be generated by a user of the telecommunications device 9 or the information processing device 1 based on content of image data IMG or may be generated through machine learning by the information processing device 1 on the image data IMG.
<S12>

The processor 11 calculates an image feature amount IFV of image data IMG in each dataset Dst and extracts the image feature amount IFV with the image feature amount extracting unit 111.

For example, the image feature amount extracting unit 111 performs the calculation processing with the CNN 200 illustrated in FIG. 3 on the image data IMG. The processor 11 thus obtains the image feature amount IFV concerning the image data IMG. For example, the processor 11 temporarily stores the obtained image feature amount IFV into the RAM 12.

As illustrated in FIG. 10, the image feature amount IFV is represented in a form of, for example, two-dimensional data in which a plurality of numeric values num are arranged in an m×n two-dimensional space. Note that the image feature amount IFV may be represented in a form of one-dimensional data in which the numeric values num are arranged in a one-dimensional space or multidimensional data in which the numeric values num are arranged in a three-dimensional or higher-dimensional space. In FIG. 10, magnitudes of the numeric values num indicating the feature amount are schematically illustrated in a form of shades of a color ranging from white to black. A relation between the illustrated image data IMG and the illustrated feature amount IFV is merely an example; the magnitudes of the numeric values num of the feature amount IFV vary depending on parameters and a calculation model used for the calculation.

<S13>

The processor 11 calculates language feature amounts LFV of text labels TX in each dataset Dst and extracts the language feature amounts LFV with the language feature amount extracting unit 112.

For example, the language feature amount extracting unit 112 performs the calculation processing with the BERT 300 illustrated in FIG. 4 on the text labels TX. The processor 11 thus obtains the language feature amounts LFV concerning the text labels TX. For example, the processor 11 temporarily stores the obtained one or more language feature amounts LFV into the RAM 12.

As illustrated in FIG. 10, in a given dataset Dst, a plurality of language feature amounts LFVa, LFVb, LFVc, and LFVd are calculated and extracted correspondingly to a plurality of text labels TXa, TXb, TXc, and TXd, respectively. The language feature amounts LFV are each represented in a form of, for example, two-dimensional data in which a plurality of numeric values num are arranged in an i×j two-dimensional space. Note that the language feature amounts LFV may be each represented in a form of one-dimensional data in which the numeric values num are arranged in a one-dimensional space or multidimensional data in which the numeric values num are arranged in a three-dimensional or higher-dimensional space. A relation between the illustrated text labels TX and the illustrated feature amounts LFV is merely an example; the magnitudes of the numeric values num of the feature amounts LFV vary depending on parameters and a calculation model used for the calculation.

In the present embodiment, an image feature amount IFV and language feature amounts LFV generated from a given dataset Dst need not have similarities to one another. However, a plurality of language feature amounts LFV generated from a plurality of text labels TX in a given dataset Dst desirably have similarities to one another. It is desirable that a design of the calculation model for the language feature amount extracting unit 112, settings of a method for calculating feature amounts, and/or settings of various types of parameters be made as appropriate so that a plurality of text labels TX in a given dataset Dst have similarities to one another.

<S14>

The processor 11 associates the one image feature amount IFV with the one or more language feature amounts LFV in the given dataset Dst. For example, the processor 11 links the image feature amount IFV and the language feature amounts LFV in the given dataset Dst to the same identification number ID.

In the example illustrated in FIG. 10, an identification number ID<0> is linked to the image feature amount IFV and the plurality of language feature amounts LFVa, LFVb, LFVc, and LFVd corresponding to the dataset Dst<0>.

<S15>

The processor 11 stores the image feature amount IFV and the language feature amounts LFV obtained by the processing of S12, S13, and S14 into the storage device 5. The processor 11 transmits the image feature amount IFV and the language feature amounts LFV associated with each other in the given dataset Dst via the interface circuit 19 to the storage device 5.

The storage device 5 receives the image feature amount IFV and the language feature amounts LFV. In the storage device 5, the controller 50 writes the image feature amount IFV at a given address in the nonvolatile semiconductor memory device 51. The controller 50 writes the language feature amounts LFV at a given address in the nonvolatile semiconductor memory device 51. Note that the image feature amount IFV and the language feature amounts LFV may be written as a series of data at consecutive addresses.

For example, an identification number ID linked to an image feature amount IFV and language feature amounts LFV may be managed together with addresses at which the image feature amount IFV and the language feature amounts LFV are stored, according to management information on the information processing device 1 or management information on the controller 50. The identification number ID may be written at a given address in the nonvolatile semiconductor memory device 51.

The information processing device 1 in the present embodiment thus finishes the advance preparation phase for the given dataset Dst.

The information processing device 1 performs the processing of S11 to S15 on each of the plurality of datasets Dst.

As a result, a database DB including a plurality of feature amount sets Fst is generated.

By the calculation of the image feature amounts IFV and the calculation of the language feature amounts LFV using the plurality of datasets Dst, the image feature amount extracting unit 111 and the language feature amount extracting unit 112 are trained.

The description is here given of an example in which the database DB is generated from the datasets Dst each including image data IMG and text labels TX. However, calculation processing of feature amounts of image data IMG and calculation processing of feature amounts of text labels TX, where the image data IMG and the text labels TX are in connection with each other, may be performed at time points different from each other.

For example, at a given time point, only items of image data IMG are supplied to the information processing device 1, and image feature amounts IFV are calculated. An image feature amount space FA1 in the database DB is thereby formed. At another time point thereafter, only text labels TX are supplied to the information processing device 1, and language feature amounts LFV are calculated. A language feature amount space FA2 in the database DB is thereby formed. The information processing device 1 associates the image feature amounts IFV with the language feature amounts LFV at a time of supplying the text labels TX or at a time of calculating the language feature amounts. In this manner, the language feature amounts LFV may be additionally associated with the image feature amounts IFV to form the feature amount sets Fst.

Note that any one of the language feature amounts LFV and the image feature amount IFV in a feature amount set Fst may be deleted from the feature amount set Fst.

In this manner, the language feature amounts LFV and the image feature amounts IFV in the database DB can be edited as appropriate after the advance preparation phase.

The image feature amount space FA1, the language feature amount space FA2, and the database DB may be generated by performing various types of processing and deep learning on an item of given data.

As illustrated in FIG. 11, by performing various types of processing on image data IMG in a given dataset Dst supplied, the information processing device 1 may generate image data that includes an image different from an image in the image data IMG. For example, the information processing device 1 performs inversion processing, contrast changing processing, and zooming processing on a given item of image data IMG.

The information processing device 1 calculates an image feature amount IFVx of image data IMGx generated by the inversion processing. The information processing device 1 calculates an image feature amount IFVy of image data IMGy obtained by the contrast changing processing. The information processing device 1 calculates an image feature amount IFVz of image data IMGz obtained by the zooming processing.

In this case, language feature amounts LFVa, LFVb, . . . that are associated with each of the image feature amounts IFVx, IFVy, and IFVz of the items of image data IMGx, IMGy, and IMGz obtained by the various types of processing are the same as language feature amounts LFVa, LFVb, . . . of text labels TXa, TXb, . . . that are associated with the original image data IMG.

In this manner, a plurality of image feature amounts IFV, IFVx, IFVy, and IFVz are obtained from the one item of image data IMG. This increases the number of feature amount sets Fst stored in the storage device 5.

As a result, the information processing device 1 can improve in recognition precision of the image data IMG and the text labels TX for the query data QR.

As described with reference to FIG. 9 to FIG. 11, the image data IMG and the text labels TX are respectively converted into the image feature amount IFV and the language feature amounts LFV, which are numeric data. The obtained feature amounts IFV and LFV are stored in the storage device 5.

In the present embodiment, this enables the storage device 5 of the computer system SYS to store a large amount of data to be used in machine learning for the information processing device 1, more efficiently.

Note that image feature amounts IFV and language feature amounts LFV of a plurality of datasets Dst may be collectively written in the storage device 5. Further, image feature amounts IFV and the language feature amounts LFV may be stored in the storage device 5 without associating an image feature amount IFV and language feature amounts LFV with each other for each dataset Dst.

(3-2) Classification Task Phase

Figure 12:
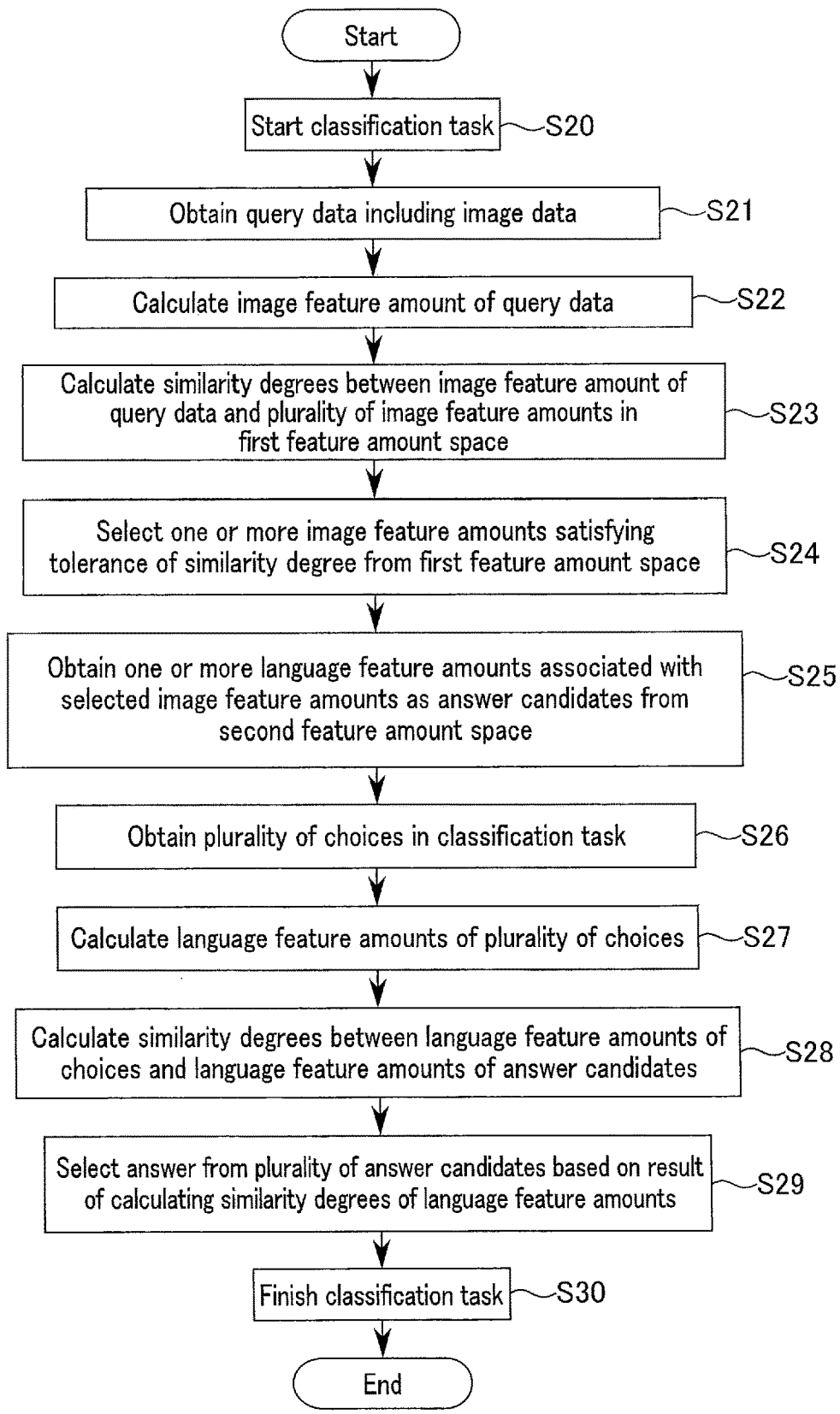
FIG. 12 is a flowchart for explaining a classification task phase of the computer system in the first embodiment.
Figure 17:
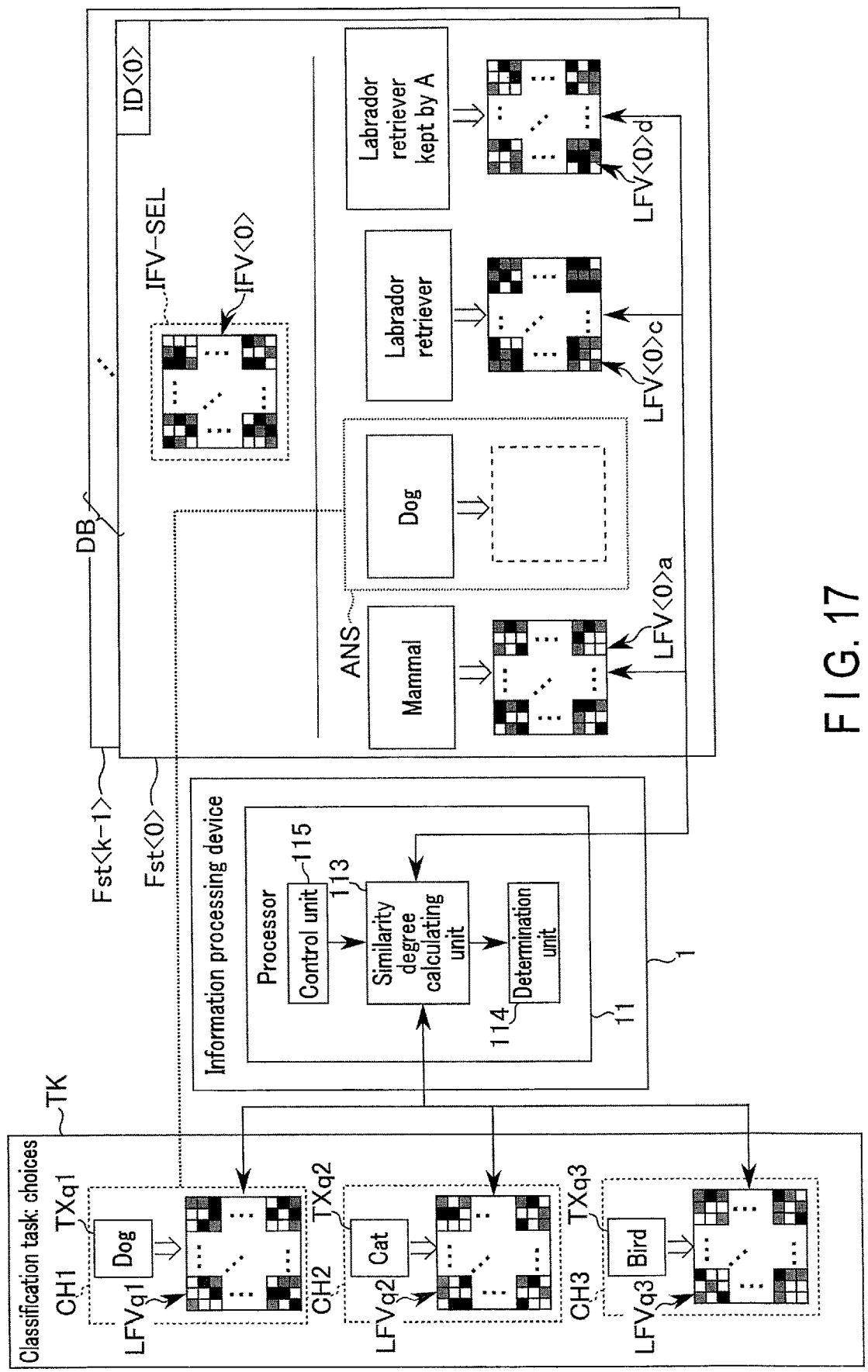
FIG. 17 is a schematic diagram for explaining still another part of the classification task phase in the first embodiment.

With reference to FIG. 12 and FIG. 17, processing in a classification task phase in the information processing method by the information processing device 1 in the present embodiment will be described.

As described below, in the computer system SYS, the processor 11 of the information processing device 1 in the present embodiment performs a classification task TK on query data QR through two-stage similarity search processing. The two-stage similarity search processing is processing with a plurality of image feature amounts IFV and a plurality of language feature amounts LFV in the database DB generated by the advance preparation phase.

FIG. 12 is a flowchart for explaining the classification task phase in the information processing method by the information processing device 1 in the present embodiment. FIG. 13 to FIG. 17 are each a schematic diagram for explaining the classification task phase in the information processing device 1 and the computer system SYS in the present embodiment.

<S20>

The information processing device 1 starts the classification task TK. For example, the processor 11 of the information processing device 1 accesses the RAM 12, the ROM 13, and the storage device 5 and starts various types of control and processing for performing the classification task TK.

<S21>

Figure 13:
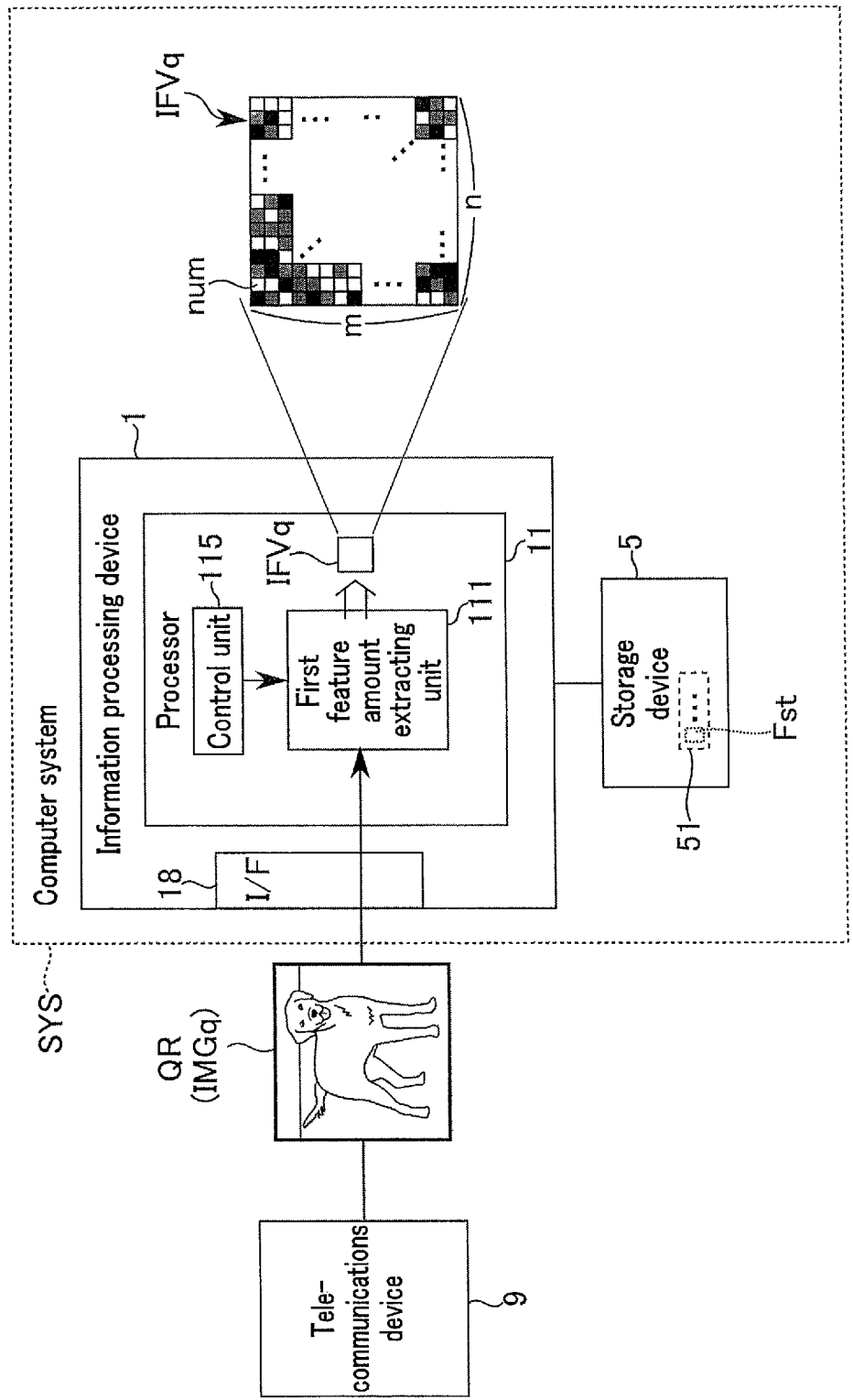
FIG. 13 is a schematic diagram for explaining a part of the classification task phase in the first embodiment.

The information processing device 1 receives the query data QR. For example, as illustrated in FIG. 13, the query data QR is supplied from the telecommunications device 9 to the interface circuit 18 of the information processing device 1.

In the information processing device 1, the processor 11 receives the query data QR via the interface circuit 18. In the present embodiment, the query data QR includes image data IMGq.

<S22>

The information processing device 1 calculates an image feature amount IFVq of the image data IMGq of the query data QR.

For example, as illustrated in FIG. 13, the processor 11 calculates the image feature amount IFVq of the image data IMGq with the image feature amount extracting unit 111 including CNN 200, under control by the control unit 115. The image feature amount IFVq concerning the query data QR is thus extracted from the image data IMGq.

For example, the image feature amount IFVq of the query data QR is represented in a form of an m×n two-dimensional data as with the image feature amount IFV in the feature amount set Fst. Note that the image feature amount IFVq of the query data QR may be represented in a form of one-dimensional data or three-dimensional or higher-dimensional data. The image feature amount IFVq includes a plurality of (m×n) numeric values num that are arranged in an m×n area. Hereinafter, the image feature amount IFVq of the image data IMGq included in the query data QR is referred to also as query image feature amount IFVq.

<S23>

The information processing device 1 performs first similarity search processing on the image data IMGq (the query image feature amount IFVq) being the query data QR.

In the first similarity search processing, the information processing device 1 performs calculation processing of similarity degrees between the image feature amount IFVq of the query data QR and a plurality of image feature amounts IFV in the database DB to search an image feature amount space FA1 for image data IMG having a relatively high similarity to the query data QR. For example, the similarity degrees are calculated by using a calculation method such as inner product, cosine similarity, or Euclidean distance.

For example, the processor 11 accesses the database DB of the storage device 5. The processor 11 retrieves the plurality of image feature amounts IFV from the storage device 5 to the RAM 12.

Figure 14:
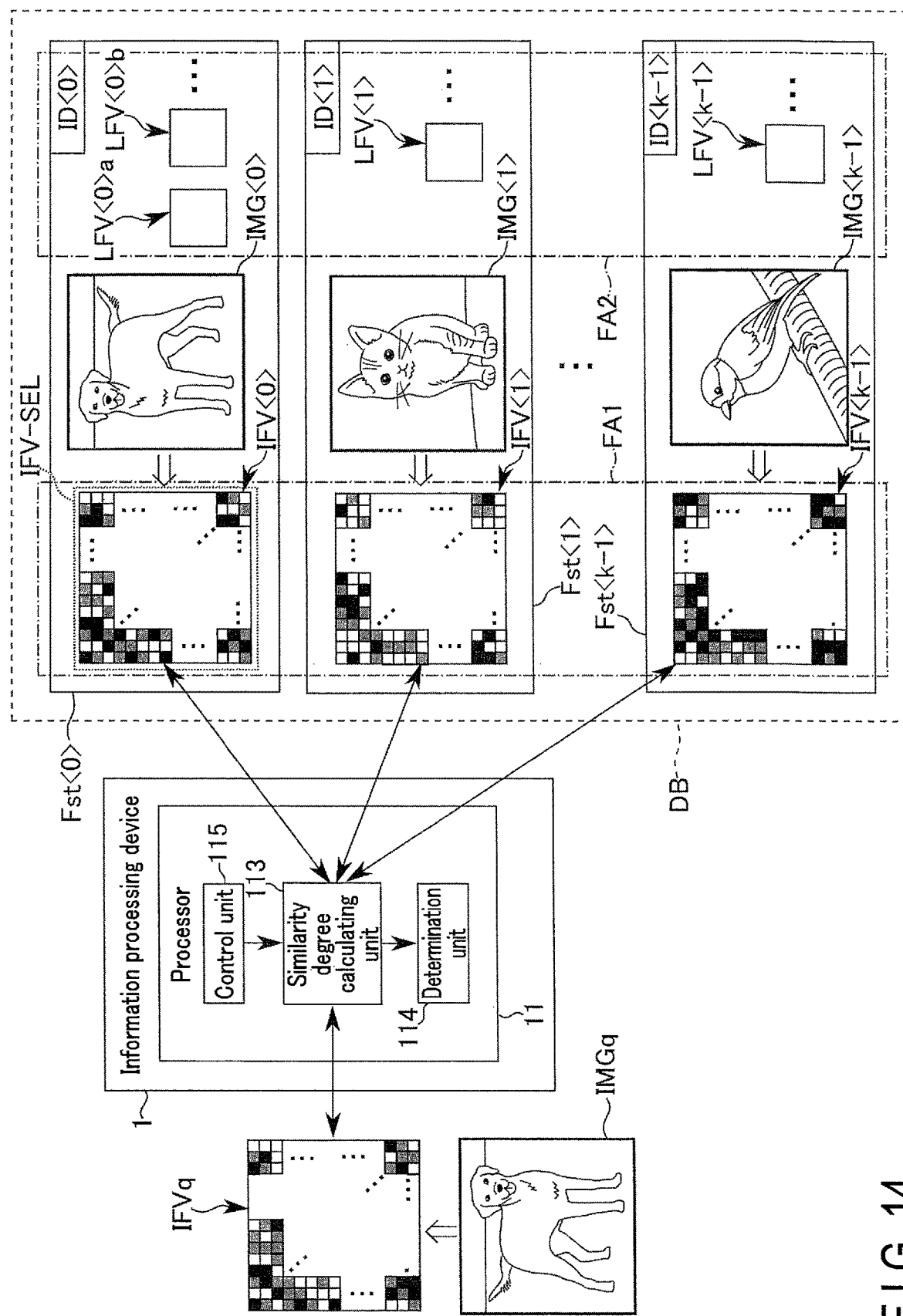
FIG. 14 is a schematic diagram for explaining another part of the classification task phase in the first embodiment.

For example, as illustrated in FIG. 14, the processor 11 calculates similarity degrees between the image feature amount IFVq of the query data QR and a plurality of image feature amounts IFV<0>, IFV<1>, . . . , IFV<k−1> in the database DB with the similarity degree calculating unit 113, under control by the control unit 115.

For example, the first similarity search processing on the image feature amounts IFV and IFVq can be enhanced in speed and/or efficiency by creating a graph on the image feature amounts IFV and IFVq and the calculated similarity degrees.

<S24>

Based on a result of calculation of the similarity degrees for the image feature amounts IFVq and IFV in the first similarity search processing, the information processing device 1 selects one or more image feature amounts IFV-SEL associated with image data IMG that is considered to be similar to the query data QR from the image feature amount space FA1 including the plurality of image feature amounts IFV.

For example, the processor 11 determines whether a similarity degree between the query image feature IFVq and a given image feature IFV is greater than or equal to a threshold value with the determination unit 114. The processor 11 thus selects the image feature amounts IFV-SEL each having a similarity degree greater than or equal to the threshold value. For example, the processor 11 selects an image feature amount IFV-SEL that has the highest similarity degree to the query image feature amount IFVq of the image data IMGq.

In an example illustrated in FIG. 14, the image feature amount IFV<0> with the identification number of ID<0> is treated as the selected image feature amount IFV-SEL.

<S25>

Based on the selected image feature amount IFV-SEL, the information processing device 1 selects and obtains one or more language feature amounts LFV associated with the image feature amount IFV-SEL from a language feature amount space FA2 in the database DB.

For example, the processor 11 accesses the database DB in the storage device 5. The processor 11 retrieves the one or more language feature amounts LFV associated with the selected image feature amount IFV-SEL from the storage device 5 to the RAM 12 based on an identification number of the selected image feature amount IFV-SEL. The processor 11 thus obtains the language feature amounts LFV associated with the selected image feature amount IFV-SEL. Note that the language feature amounts LFV may be retrieved into the RAM 12 concurrently with the retrieval of the image feature amounts IFV-SEL.

For example, in the example illustrated in FIG. 14, when the image feature amount IFV<0> with the identification number of ID<0> is selected, the processor 11 selects and obtains a plurality of language feature amounts LFV<0>a, LFV<0>b, . . . with the identification number of ID<0> from the language feature amount space FA2 including a plurality of language feature amounts LFV. In this manner, language feature amounts LFV having the same identification number ID as a selected image feature IFV-SEL is selected based on the identification number ID.

For example, the plurality of selected language feature amounts LFV<0>a, LFV<0>b, . . . are answer candidates in the classification task TK.

<S26>

The information processing device 1 generates and obtains one or more choices CH for the classification task TK on the query data QR. The choices CH each include a text label TXq.

Figure 15:
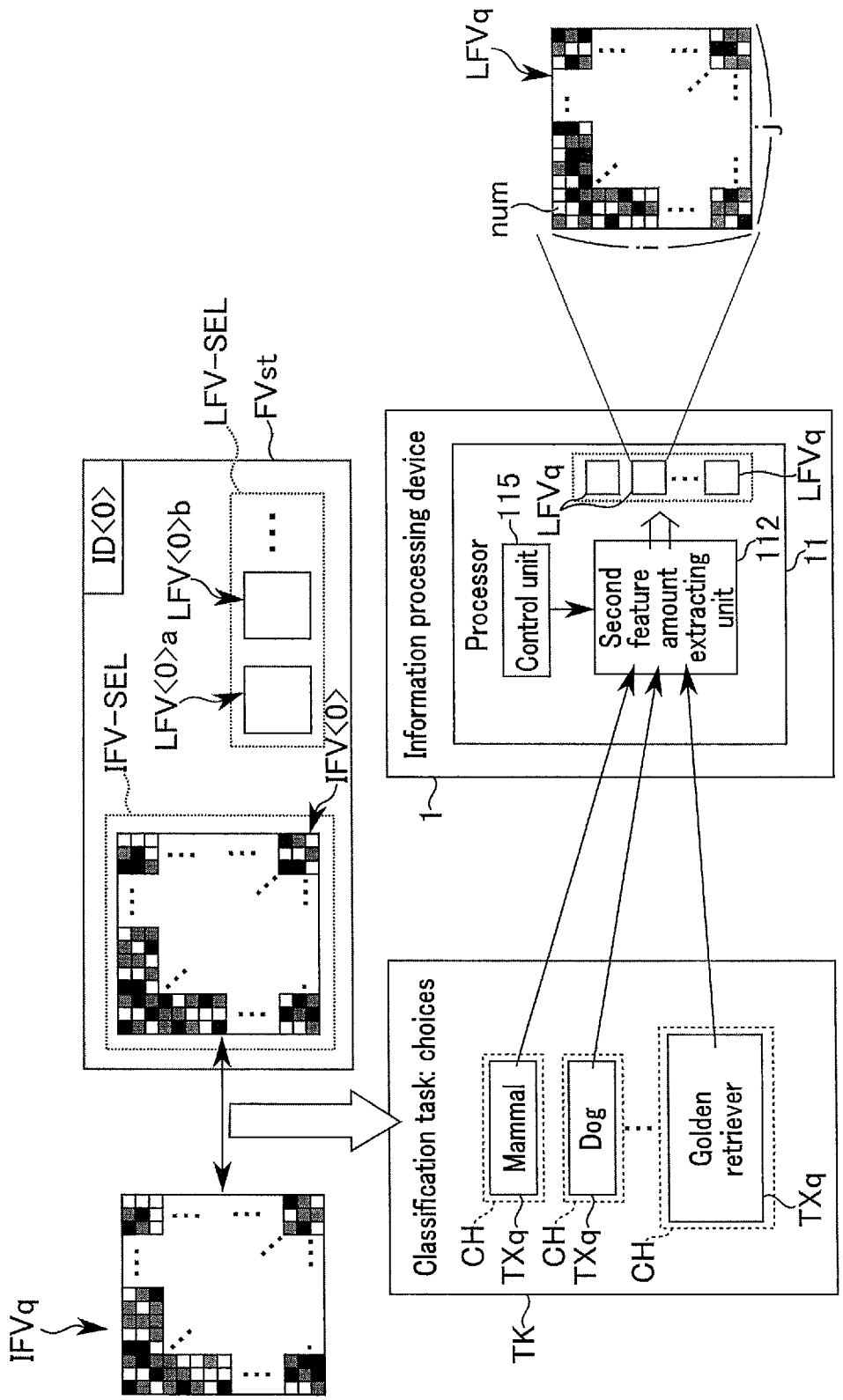
FIG. 15 is a schematic diagram for explaining still another part of the classification task phase in the first embodiment.

For example, as illustrated in FIG. 15, the processor 11 generates and obtains a plurality of text labels TXq as the choices CH based on the query image feature amount IFVq and the selected image feature amount IFV-SEL. Note that the choices CH and the text labels TXq may be supplied to the information processing device 1 from an outside of information processing device 1, for example, the telecommunications device 9. The choices CH and the text labels TXq may be supplied to the information processing device 1 concurrently with the query data QR.

The text labels TXq of the choices CH can be alternatively called text data associated with the image data IMGq of the query data QR.

<S27>

The information processing device 1 calculates language feature amounts LFVq of the text labels TXq included in the plurality of choices CH.

For example, as illustrated in FIG. 15, the processor 11 calculates the language feature amounts LFVq of the text labels TXq of the choices CH, with the language feature amount extracting unit 112 including the BERT 300, under control by the control unit 115. The language feature amounts LFVq concerning the choices CH are thus extracted. One or more language feature amounts LFVq are obtained based on the number of the answer candidates.

For example, the language feature amounts LFVq of the choices CH are each represented in a form of i×j two-dimensional data as with language feature amounts LFV in a feature amount set Fst. Note that the language feature amounts LFVq of the choices CH may be represented in a form of one-dimensional data or three-dimensional or higher-dimensional data. The language feature amounts LFVq each include a plurality of (i×j) numeric values num that are arranged in an i×j area.

<S28>

In the present embodiment, second similarity search processing concerning the text labels TXq (language feature amounts LFVq) of the choices CH is performed.

In the second similarity search processing, the information processing device 1 performs calculation processing of similarity degrees between the language feature amounts LFVq of the choices CH and the plurality of obtained language feature amounts LFV to search a language feature amount space FA2 for a text label TX having a relatively high similarity to a text label TXq of a choice CH. As in the example described above, the similarity degrees are calculated by using a calculation method such as inner product, cosine similarity, or Euclidean distance.

For example, as illustrated in FIG. 16, the processor 11 calculates similarity degrees between language feature amounts LFVqa and LFVgb and a plurality of language feature amounts LFV<0>a, LFV<0>b, LFV<0>c, and LFV<0>d in the database DB, with the similarity degree calculating unit 113, under control by the control unit 115.

For example, the similarity search processing on the language feature amounts LFV and LFVq can be enhanced in speed and/or efficiency by creating a graph on the language feature amounts LFV and LFVq and the calculated similarity degrees.

<S29>

Based on a result of the calculation processing of the similarity degrees for the language feature amounts LFV and LFVq in the second similarity search processing, the information processing device 1 selects one answer ANS from among the plurality of choices CH and the plurality of answer candidates.

For example, the processor 11 determines whether a similarity degree between a language feature amount LFVq of a choice CH and a language feature amount LFV of an answer candidate is greater than or equal to a threshold value with the determination unit 114. The processor 11 selects a language feature amount LFV having a similarity degree greater than or equal to the threshold value.

The selected language feature amount LFV (and a language feature amount LFVq of a choice CH corresponding to the selected language feature amount LFV) is an answer ANS in the classification task TK.

In an example illustrated in FIG. 16, of a plurality of choices CHa and CHb, the choice CHa includes a language feature amount LFVqa corresponding to a character string "LABRADOR RETRIEVER", and the choice CHb includes a language feature amount LFVqb corresponding to a character string "GOLDEN RETRIEVER".

The plurality of language feature amounts LFV obtained as the answer candidates include a language feature amount LFV<0>a corresponding to a character string "MAMMAL", a language feature amount LFV<0>b corresponding to a character string "DOG", a language feature amount LFV<0>c corresponding to a character string "LABRADOR RETRIEVER", and a language feature amount LFV<0>d corresponding to a character string "LABRADOR RETRIEVER KEPT BY A", respectively.

In this case, based on a result of the processing by the determination unit 114, the processor 11 selects a text label TX including the character string of the language feature amount LFV<0>c (and the choice CH having the language feature amount LFVqa) as the answer ANS in the classification task TK.

Note that there may be a case where a text label TX that matches a choice CH in a classification task TK (i.e., the same language feature amount LFV as a language feature amount LFVq of the choice CH) does not exist in a language feature amount space FA2 in the database DB.

For example, in the example illustrated in FIG. 17, a plurality of choices CH1, CH2, and CH3 include a language feature amount LFVq1 corresponding to a character string (CH1) "DOG", a language feature amount LFVq2 corresponding to a character string (CH2) "CAT", and a language feature amount LFVq3 corresponding to a character string (CH3) "BIRD", respectively. The plurality of language feature amounts LFV obtained as the answer candidates include a language feature amount LFV<0>a corresponding to a character string "MAMMAL", a language feature amount LFV<0>c corresponding to a character string "LABRADOR RETRIEVER", and a language feature amount LFV<0>d corresponding to a character string "LABRADOR RETRIEVER KEPT BY A", respectively. In FIG. 17, there is no language feature amount LFV corresponding to a character string "DOG".

Even in a case, the information processing device 1 in the present embodiment can select, as an answer ANS, a text label TX corresponding to "DOG" based on magnitudes of similarity degrees between the language feature amounts LFVq of the choices CH and the plurality of language feature amounts LFV obtained as the answer candidates.

As described above, in the present embodiment, language feature amounts LFV of a plurality of text labels TX in each Dataset Dst, are calculated and extracted in the calculation processing and extraction processing of the language feature amounts LFV in the advance preparation phase such that the language feature amounts LFV have values correlating with one another.

Accordingly, even when there is no answer candidate (text label TX) that totally matches a choice CH in a classification task, and/or there is an answer candidate including an expression that is vague about a choice CH, the information processing device 1 in the present embodiment can select an answer ANS based on magnitudes of similarity degree between language feature amounts LFVq corresponding to the choices CH and language feature amounts LFV of answer candidates.

Consequently, even when no language feature LFV corresponding to a text label TX matching a choice CH exists in a database DB, a text label TX to be an answer ANS can be derived from among language feature amounts LFV having highest similarity degree to choices CH based on a result of calculating similarity degrees between the language feature amounts LFVq of text labels TXq of the choices CH and the language feature amounts LFV retrieved from the database DE.

<S30>

The information processing device 1 finishes the classification task TK. For example, based on the answer ANS in the classification task TK, the processor 11 classifies the query data QR into a category or a class corresponding to the answer ANS. A result of the classification task TK may be displayed on a display device (not illustrated) of the information processing device 1.

With this, the processing for the classification task by the information processing device 1 in the present embodiment is finished.

(4) CONCLUSION

The information processing device 1 and the computer system SYS in the present embodiment perform the similarity search processing in a plurality of stages in a plurality of fields, such as a combination of images and a natural language.

The information processing device 1 in the present embodiment thus can improve in precision of a performed task as compared with a case where an answer to a task based on similarity search processing in only one field is determined.

The information processing device 1 in the present embodiment is capable of providing diverse answers in a task on query data by obtaining a plurality of answer candidates through the operation and processing described above.

Accordingly, the information processing device 1 in the present embodiment can select a better answer from among a plurality of answer candidates according to content of a question of query data QR.

As described above, the information processing device and the information processing method in the present embodiment can improve a precision of a task of machine learning.

[B] SECOND EMBODIMENT

With reference FIG. 18, an information processing method, an information processing device, and a computer system in a second embodiment will be described.

In the present embodiment, an information processing device 1 is capable of determining an answer ANS based on inference processing through majority processing using a plurality of image feature amounts IFV (IFV-SEL) similar to an image feature amount IFVq of image data IMGq as query data and language feature amounts LFV associated with the similar image feature amounts IFV.

Figure 18:
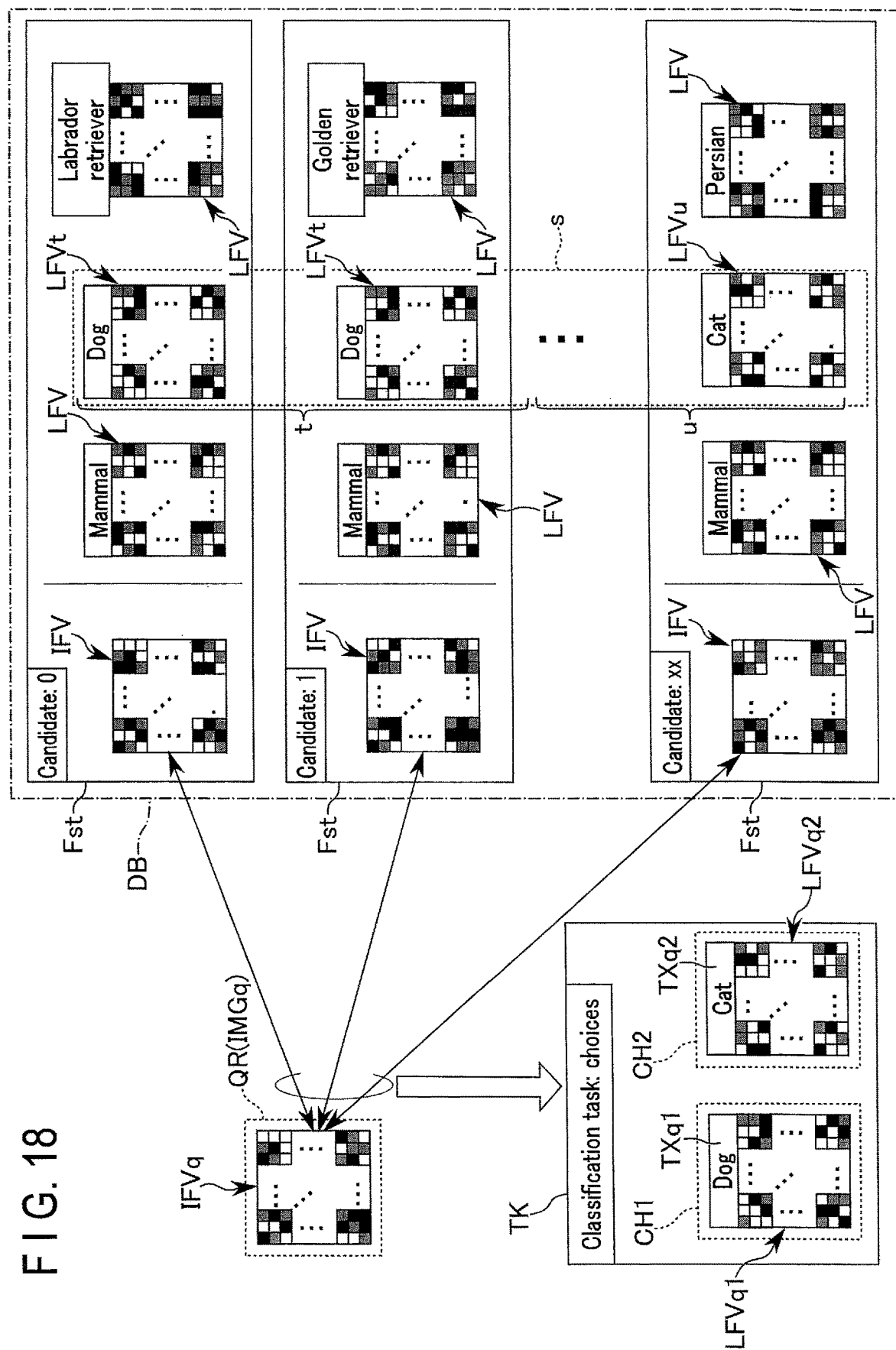
FIG. 18 is a schematic diagram for explaining an information processing method in a second embodiment.

FIG. 18 is a schematic diagram for explaining inference processing of the information processing method by the information processing device 1 in the present embodiment.

The inference processing is processing of predicting and determining which of a plurality of choices CH (and answer candidates) query data supplied to the information processing device 1 corresponds to.

As illustrated in FIG. 18, the information processing device 1 receives the image data IMGq as query data QR (i.e., query image data), as described above. The information processing device 1 starts a classification task TK on the query image data IMGq.

As described above, the information processing device 1 calculates and extracts the image feature amount IFVq of the query image data IMGq with an image feature amount extracting unit 111 of a processor 11. The information processing device 1 searches for and selects a plurality of image feature amounts IFV that have relatively high similarity degrees to the calculated image feature amount IFVq from a database DB of a storage device 5 by similarity search processing concerning an image field.

As described above, the information processing device 1 obtains one or more language feature amounts LFV in connection with one or more selected image feature amounts IFV-SEL. The information processing device 1 calculates and extracts a language feature amount LFVq for each of text labels TXq as one or more choices CH in the classification task TK with a language feature amount extracting unit 112 of the processor 11.

The information processing device 1 searches for and selects a plurality of language feature amounts LFV that have relatively high similarity degrees to the calculated language feature amounts LFVq of the choices CH from the database DB of the storage device 5 by similarity search processing concerning a natural language field.

The information processing device 1 performs, with the processor 11, the inference processing for an answer ANS to the choices CH based on a result of calculation of the similarity degrees for the language feature amounts LFV and LFVq in the similarity search processing.

In the present embodiment, in the inference processing for an answer to the choices CH, the information processing device 1 selects a given number (here, the number is s) of top language feature amounts LFV having relatively high similarity degrees in descending order of similarity degree to language feature amounts LFVq of the choices CH, from among the plurality of language feature amounts LFV associated with the one or more selected image feature amounts IFV. Here, "s" is an integer greater than or equal to one.

From among the number s of language feature amounts LFV, the information processing device 1 counts the numbers of language feature amounts LFV that have substantially the same values. As a result, the information processing device 1 divides the language feature amounts LFV into groups each of which is a set of language feature amounts LFV having substantially the same value. Note that the counting is not limited to counting language feature amounts LFV having the same value, and the numbers of language feature amounts LFV belonging to given numeric ranges may be counted.

The counting of the numbers of language feature amounts LFV concerning given numeric values (or given numeric ranges) corresponds to counting the numbers of text labels TX having the substantially same content (e.g., character string) according to content of text label TX.

From among one or more sets including language feature amounts LFV, the information processing device 1 selects a set having the largest number of language feature amounts LFV belonging to the set as an answer ANS in the classification task TK.

For example, as illustrated in FIG. 18, when a text label TXq1 "DOG" and a text label TXq2 "CAT" are presented as the choices CH in the classification task TK, the information processing device 1 calculates and extracts a language feature amount LFVg1 corresponding to the text label TXq1 "DOG" and a language feature amount LFVq2 corresponding to the text label TXq2 "CAT" with the language feature amount extracting unit 112.

On a plurality of language feature amounts LFV associated with image feature amounts IFV, the information processing device 1 performs calculation processing of similarity degrees between the language feature amount LFVq1 and the plurality of language feature amounts LFV and performs calculation processing of similarity degrees between the language feature amount LFVq2 and the plurality of language feature amounts LFV, for the similarity search processing. The information processing device 1 thus obtains the number s of language feature amounts LFV having values greater than or equal to a given threshold value from among a plurality of language feature amounts LFV in a plurality of feature amount sets Fst selected by the similarity search processing on the image feature amounts IFV and IFVq, based on the similarity degrees of the language feature amount LFVq of the choices CH.

From among the number s of language feature amounts LFV, the information processing device 1 counts the number of language feature amounts LFVt that are similar to a numeric value corresponding to "DOG" and counts the number of language feature amounts LFVu that are similar to a numeric value corresponding to "CAT". As an example, the number of the language feature amounts LFV having the numeric value corresponding to "DOG" is t, and the number of the language feature amounts LFV having the numeric value corresponding to "CAT" is u. Here, "t" and "u" are each an integer greater than or equal to zero and less than or equal to s.

When "t" is greater than "u", the information processing device 1 selects "DOG" as the answer ANS from between the choices CH (and answer candidates) "DOG" and "CAT". When "t" is less than "u", the information processing device 1 selects "CAT" as the answer ANS from between the choices CH (and answer candidates) "DOG" and "CAT".

Note that when "t" is equal to "u", the information processing device 1 selects, as the answer ANS, any one of a plurality of choices CH (and answer candidates) based on a prescribed rule.

As described above, in the present embodiment, the information processing device 1 can determine one answer ANS to a plurality of choices CH (and answer candidates) in a classification task TK by the majority processing on language feature amounts LFV.

As a result, the information processing device, the computer system, and the information processing method in the present embodiment can improve a precision of the task.

[C] APPLICATION EXAMPLES

The information processing device 1 and the computer system in the present embodiment are applied to an image recognition system, a sound recognition system, a medical system, and the like.

In a case where the information processing device 1 in the present embodiment is applied to an image recognition system, for example, images are selected as being in a first field (and a first feature amount space), and natural languages are selected as being in a second field (and a second feature amount space) as in the embodiments described above. Note that the images may be of faces, fingerprints, eyeballs (or irises), or the like of persons. The natural language may be character strings of names of objects, persons' names, movements of objects, and the like.

Note that, in the information processing device 1 applied to the image recognition system, the natural languages may be selected as being in the first field, and the images may be selected as being in the second field.

In a case where the information processing device 1 in the present embodiment is applied to a sound recognition system, for example, natural languages may be selected as being in a first field, and sounds may be selected as being in a second field.

In this case, for example, a text label into which an animal cry is converted into a text is supplied to the information processing device 1 as query data QR. For example, items of sound data are items of data on animal cries. Hereinafter, feature amounts of the items of sound data are referred to as sound feature amounts.

The information processing device 1 in the sound recognition system performs similarity search processing on the text label being the query data QR and text labels in a database DB, using a plurality of language feature amounts. The information processing device 1 calculates and extracts sound feature amounts of items of sound data corresponding to choices CH. The information processing device 1 performs similarity search processing on the sound feature amounts of the choices CH and sound feature amounts of items of sound data associated with selected text labels. As a result, the information processing device 1 determines an item of sound data as an answer ANS in a classification task.

In the sound recognition system, a storage device 5 stores a plurality of feature amounts concerning text labels and a plurality of feature amounts concerning items of sound data, in a form of a database DB.

Note that, in the information processing device 1 applied to the sound recognition system, the sounds may be selected as being in the first field, and the images may be selected as being in the second field. In the information processing device 1 applied to the sound recognition system, sounds in a first language system may be selected as being in the first field, and natural languages in a second language system different from the first language system may be selected as being in the second field. Note that the sounds included in the items of sound data may be sounds produced from living things, such as animal cries or human voices or may be sounds produced from inanimate objects such as a machine or a structure.

In a case where the information processing device 1 in the present embodiment is applied to a medical system, for example, biological signals may be selected as being in a first field, and natural languages may be selected as being in a second field. The biological signals include one or more types including brain wave, heartbeat, pulse, blood pressure, respiration, and perspiration.

In this case, an item of biological signal data on a given subject is supplied to the information processing device 1 as query data QR. The information processing device 1 performs similarity search processing on a feature amount of the item of biological signal data as the query data QR and feature amounts of items of biological signal data in a database DB. The information processing device 1 calculates and extracts language feature amount corresponding to choices CH on the natural language. The information processing device 1 performs similarity search processing on the language feature amounts of the choices CH and language feature amounts associated with selected text labels. Based on a result, the information processing device 1 determines a text label as an answer ANS in a classification task.

For example, text labels associated with the items of biological signal data include a status (e.g., sentiment), a name of a disease, a case of a disease, a name of a remedy, and the like of the subject.

In the medical system, a storage device 5 stores a plurality of feature amounts concerning biological signals and a plurality of feature amounts concerning text labels, in a form of a database DB.

The information processing device 1 applied to a medical system may use images as a field and a feature amount space in similarity search processing. In this case, an X-ray image, a magnetic resonance image, an electrocardiogram, and the like are used as the images for calculating feature amounts.

The information processing device 1 in the present embodiment may be applied to a system other than the systems described in this application examples.

The system including the information processing device 1 in the present embodiment is capable of providing the advantageous effects described above.

[D] OTHER RESPECTS

In the embodiments described above, the information processing device 1 and the information processing method perform a classification task on query data through the two-stage similarity search processing using two fields (and two feature amount spaces).

However, the information processing device 1 and the information processing method in the embodiments may perform a classification task on query data through similarity determination processing in three or more stages using three or more fields (feature amount spaces).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing method comprising:
    receiving query data to be processed;
    calculating a first feature amount in a first field of the query data, the first field being a field selected from image, natural language, sound, electric signal, and biological signal;
    calculating a plurality of first similarity degrees between the first feature amount and a plurality of second feature amounts in a first feature amount space in the first field;
    obtaining, based on the plurality of first similarity degrees, a plurality of third feature amounts in a second field that are associated with one or more feature amounts selected from the plurality of second feature amounts, from a second feature amount space in the second field, the second field being different from the first field and being a field selected from image, natural language, sound, electric signal, and biological signal, except for the field selected as the first field;
    calculating one or more fourth feature amounts in the second field, for a plurality of choices concerning the query data;
    calculating a plurality of second similarity degrees between the plurality of third feature amounts and the one or more fourth feature amounts; and
    selecting, based on the plurality of second similarity degrees, at least one answer to the query data from among a plurality of answer candidates corresponding to the plurality of third feature amounts.

2. The information processing method according to claim 1, wherein the answer is selected by majority processing on the plurality of answer candidates.

3. The information processing method according to claim 1, further comprising:
generating, before the receiving of the query data, the first feature amount space by calculation processing on feature amounts of a plurality of first data items; and
generating, before the receiving of the query data, the second feature amount space by calculation processing on feature amounts of a plurality of second data items associated with the plurality of first data items.

4. The information processing method according to claim 1, further comprising:
receiving a third data item;
generating a fourth data item by first processing on the third data item; and
generating the first feature amount space by calculation processing on feature amounts of the third and fourth data items.

5. The information processing method according to claim 1, further comprising:
storing, before the receiving of the query data, information concerning the first feature amount space and the second feature amount space into a storage device.

6. The information processing method according to claim 1, wherein
the first similarity degrees are calculated based on at least one of inner products between the first feature amount and the second feature amounts, cosine similarities between the first feature amount and the second feature amounts, and distances between the first feature amount and the second feature amounts, and
the second similarity degrees are calculated based on at least one of inner products between the third feature amounts and the one or more fourth feature amounts, cosine similarities between the third feature amounts and the one or more fourth feature amounts, and distances between the third feature amounts and the one or more fourth feature amounts.

7. An information processing device comprising:
an interface circuit configured to receive query data to be processed; and
a processor configured to receive the query data via the interface circuit,
wherein
the processor is configured to:
calculate a first feature amount in a first field of the query data, the first field being a field selected from image, natural language, sound, electric signal, and biological signal;
obtain a plurality of second feature amounts from a first feature amount space in the first field;
calculate a plurality of first similarity degrees between the first feature amount and the plurality of second feature amounts;
obtain, based on the plurality of first similarity degrees, a plurality of third feature amounts in a second field that are associated with one or more feature amounts selected from the plurality of second feature amounts, from a second feature amount space in the second field, the second field being different from the first field and being a field selected from image, natural language, sound, electric signal, and biological signal, except for the field selected as the first field;
calculate one or more fourth feature amounts in the second field, for a plurality of choices concerning the query data;
calculate a plurality of second similarity degrees between the plurality of third feature amounts and the one or more fourth feature amounts; and
select, based on the plurality of second similarity degrees, at least one answer to the query data from among a plurality of answer candidates corresponding to the plurality of third feature amounts.

8. The information processing device according to claim 7, wherein the processor is configured to select the answer by majority processing on the plurality of answer candidates.

9. The information processing device according to claim 7, the processor is further configured to:
receive a third data item;
generate a fourth data item by first processing on the third data item; and
generate the first feature amount space by calculation processing on feature amounts of the third and fourth data items.

10. The information processing device according to claim 7, the processor is further configured to:
store, before the receiving of the query data, information concerning the first feature amount space and the second feature amount space into a storage device.

11. The information processing device according to claim 7, wherein the processor is further configured to:
calculate the first similarity degrees based on at least one of inner products between the first feature amount and the second feature amounts, cosine similarities between the first feature amount and the second feature amounts, and distances between the first feature amount and the second feature amounts, and
calculate the second similarity degrees based on at least one of inner products between the third feature amounts and the one or more fourth feature amounts, cosine similarities between the third feature amounts and the one or more fourth feature amounts, and distances between the third feature amounts and the one or more fourth feature amounts.

12. A computer system comprising:
an information processing device including an interface circuit configured to receive query data to be processed, and a processor configured to receive the query data via the interface circuit; and
a storage device configured to store a first feature amount space and a second feature amount space,
wherein the processor is configured to:
calculate a first feature amount in a first field of the query data, the first field being a field selected from image, natural language, sound, electric signal, and biological signal;
obtain a plurality of second feature amounts from the first feature amount space in the first field;
calculate a plurality of first similarity degrees between the first feature amount and the plurality of second feature amounts;
obtain, based on the plurality of first similarity degrees, a plurality of third feature amounts in a second field that are associated with one or more feature amounts selected from the plurality of second feature amounts, from the second feature amount space in the second field, the second field being different from the first field and being a field selected from image, natural language, sound, electric signal, and biological signal, except for the field selected as the first field;

calculate one or more fourth feature amounts in the second field, for a plurality of choices concerning the query data;

calculate a plurality of second similarity degrees between the plurality of third feature amounts and the one or more fourth feature amounts; and select, based on the plurality of second similarity degrees, at least one answer to the query data from among a plurality of answer candidates corresponding to the plurality of third feature amounts.

13. The computer system according to claim 12, wherein the processor is configured to select the answer by majority processing on the plurality of answer candidates.

14. The computer system according to claim 12, the processor is further configured to:

generate, before the receiving of the query data, the first feature amount space by calculation processing on feature amounts of a plurality of first data items; and generate, before the receiving of the query data, the second feature amount space by calculation processing on feature amounts of a plurality of second data items associated with the plurality of first data items.

15. The computer system according to claim 12, the processor is further configured to:

receive a third data item;

generate a fourth data item by first processing on the third data item; and generate the first feature amount space by calculation processing on feature amounts of the third and fourth data items.

16. The computer system according to claim 12, the processor is further configured to:

store, before the receiving of the query data, information concerning the first feature amount space and the second feature amount space into the storage device.

17. The computer system according to claim 12, wherein the processor is further configured to:

calculate the first similarity degrees based on at least one of inner products between the first feature amount and the second feature amounts, cosine similarities between the first feature amount and the second feature amounts, and distances between the first feature amount and the second feature amounts, and calculate the second similarity degrees based on at least one of inner products between the third feature amounts and the one or more fourth feature amounts, cosine similarities between the third feature amounts and the one or more fourth feature amounts, and distances between the third feature amounts and the one or more fourth feature amounts.

* * * * *